(12) United States Patent
Kawano

(10) Patent No.: US 12,540,717 B2
(45) Date of Patent: Feb. 3, 2026

(54) LIGHT-EMITTING DEVICE AND LIGHTING DEVICE

(71) Applicant: NICHIA CORPORATION, Anan (JP)

(72) Inventor: Yohei Kawano, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/961,444

(22) Filed: Nov. 27, 2024

(65) Prior Publication Data

US 2025/0198596 A1    Jun. 19, 2025

(30) Foreign Application Priority Data

Dec. 13, 2023    (JP) ................. 2023-210493

(51) Int. Cl.
| | |
|---|---|
| F21V 7/00 | (2006.01) |
| F21V 5/00 | (2018.01) |
| F21V 7/09 | (2006.01) |
| F21W 131/202 | (2006.01) |

(52) U.S. Cl.
CPC .............. F21V 7/0091 (2013.01); F21V 5/00 (2013.01); F21V 7/0033 (2013.01); F21V 7/0066 (2013.01); F21V 7/09 (2013.01); F21W 2131/202 (2013.01)

(58) Field of Classification Search
CPC .... F21V 7/0091; F21V 7/0033; F21V 7/0066; F21V 7/09; F21V 5/00; F21W 2131/202
USPC ................................................... 362/311.02
See application file for complete search history.

(56) References Cited

U.S. PATENT DOCUMENTS

| | | | | |
|---|---|---|---|---|
| 8,696,180 B2 * | 4/2014 | Ishida | ................... | F21S 41/365 |
| | | | | 362/520 |
| 8,757,846 B2 * | 6/2014 | Otani | ................... | F21S 41/322 |
| | | | | 362/307 |
| 2004/0070855 A1 | 4/2004 | Benitez et al. | | |
| 2006/0109669 A1 | 5/2006 | Tanaka et al. | | |
| 2006/0238884 A1 | 10/2006 | Jang et al. | | |
| 2009/0213607 A1 | 8/2009 | Tatsukawa | | |
| 2009/0219716 A1 | 9/2009 | Weaver et al. | | |
| 2010/0201910 A1 | 8/2010 | Iiyama et al. | | |

(Continued)

FOREIGN PATENT DOCUMENTS

| | | |
|---|---|---|
| CN | 110906280 | 3/2020 |
| JP | 2006-309242 | 11/2006 |

(Continued)

*Primary Examiner* — Laura K Tso
(74) *Attorney, Agent, or Firm* — MORI & WARD, LLP

(57) ABSTRACT

A light-emitting device includes a light source, including a light-emitting element and an optical axis in a first direction, and an optical element. The optical element has a surface including an incident region, a first region that reflects, toward the light source, a first light entering the optical element through the incident region, a ring-shaped second region surrounding the first region, and a ring-shaped third region surrounding the incident region. The first region reflects, toward the light source a portion of the first light that reaches a central region, overlapping the light-emitting element when viewed in the first direction, of the first region, and a portion of the first light that reaches an outer region of the first region. The second region reflects a second light entering the optical element through the incident region. The third region reflects, toward the second region, the second light reflected by the second region.

15 Claims, 30 Drawing Sheets

(56) References Cited

U.S. PATENT DOCUMENTS

| | | |
|---|---|---|
| 2013/0135887 A1 | 5/2013 | Otani et al. |
| 2014/0286019 A1 | 9/2014 | Araki et al. |
| 2014/0353688 A1 | 12/2014 | Pan et al. |
| 2020/0124250 A1 | 4/2020 | Becker et al. |

FOREIGN PATENT DOCUMENTS

| | | |
|---|---|---|
| JP | 2007-048883 | 2/2007 |
| JP | 3143874 U | 8/2008 |
| JP | 2009-224303 | 10/2009 |
| JP | 2010-140769 | 6/2010 |
| JP | 2010-211246 | 9/2010 |
| JP | 2011-100692 | 5/2011 |
| JP | 2013-137979 | 7/2013 |
| JP | 2013-168354 | 8/2013 |
| JP | 2013-211098 | 10/2013 |
| JP | 2014-232721 | 12/2014 |
| JP | 2016-066412 | 4/2016 |
| KR | 20130112577 | 10/2013 |
| WO | WO 2010/092632 | 8/2010 |
| WO | WO 2012/063758 | 5/2012 |
| WO | WO 2012/144448 | 10/2012 |
| WO | WO 2021/095399 | 5/2021 |

* cited by examiner

LIGHT-EMITTING DEVICE AND LIGHTING DEVICE

CROSS-REFERENCE TO RELATED APPLICATIONS

This application is based upon and claims the benefit of priority from the prior Japanese Patent Application No. 2023-210493, filed on Dec. 13, 2023; the entire contents of which are incorporated herein by reference.

BACKGROUND

The present disclosure relates to a light-emitting device and a lighting device.

The illuminance and illuminance distribution of lighting devices for dental treatment are specified by ISO standards to reliably illuminate an oral cavity of a patient and to reduce the light reaching the patient's eyes. Even if a lighting device for dental treatment meets ISO standards, it is favorable to be able to further reduce the glare perceived by patients. Even for lighting devices for dental treatment, it is desirable to reduce the power consumption. To reduce glare and power consumption, it is effective to reduce stray light, and to cause the light emitted from the light-emitting element to efficiently reach the target region.

SUMMARY

Certain embodiments of the present invention advantageously provide a light-emitting device and a lighting device having a high light utilization efficiency.

A light-emitting device according to one embodiment includes a light source including a light-emitting element, the light source having an optical axis extending in a first direction; and an optical element having a surface including an incident region on which light emitted from the light source is incident, a first region positioned at a side opposite to the incident region, the first region being larger than the light-emitting element when viewed in the first direction, the first region configured to reflect, toward the light source, a first light entering the optical element through the incident region, the first region configured to reflect, toward the light source: a portion of the first light that reaches a central region of the first region, the central region overlapping the light-emitting element when viewed in the first direction, and a portion of the first light that reaches an outer region of the first region positioned outward of the central region, a ring-shaped second region surrounding the first region, the second region being configured to reflect a second light entering the optical element through the incident region, and a ring-shaped third region surrounding the incident region, the third region configured to reflect, toward the second region, the second light that is reflected by the second region. The optical element is configured such that: light that is reflected by the third region is emitted from the second region, and each of the first light and the second light includes the light emitted from the light source and a third light, which is reflected by the light source after being reflected by the first region.

A lighting device according to an embodiment includes at least one light-emitting device described above.

According to certain embodiments, a light-emitting device and a lighting device that have a high light utilization efficiency can be realized.

DETAILED DESCRIPTION

First Embodiment

Figure 1:
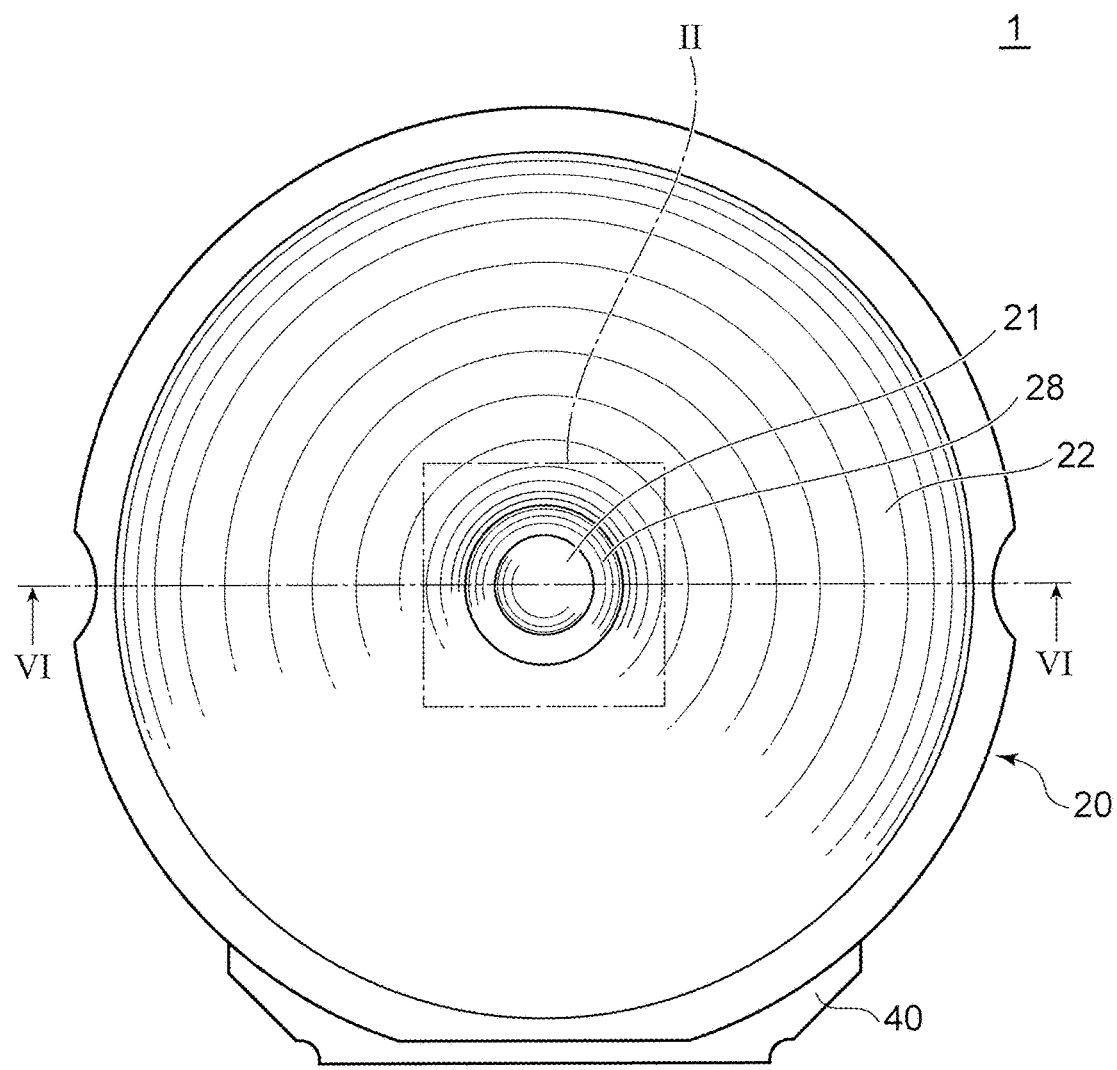
FIG. 1 is a top view showing a light-emitting device according to a first embodiment.

FIG. 1 is a top view showing a light-emitting device according to the present embodiment.

Figure 2:
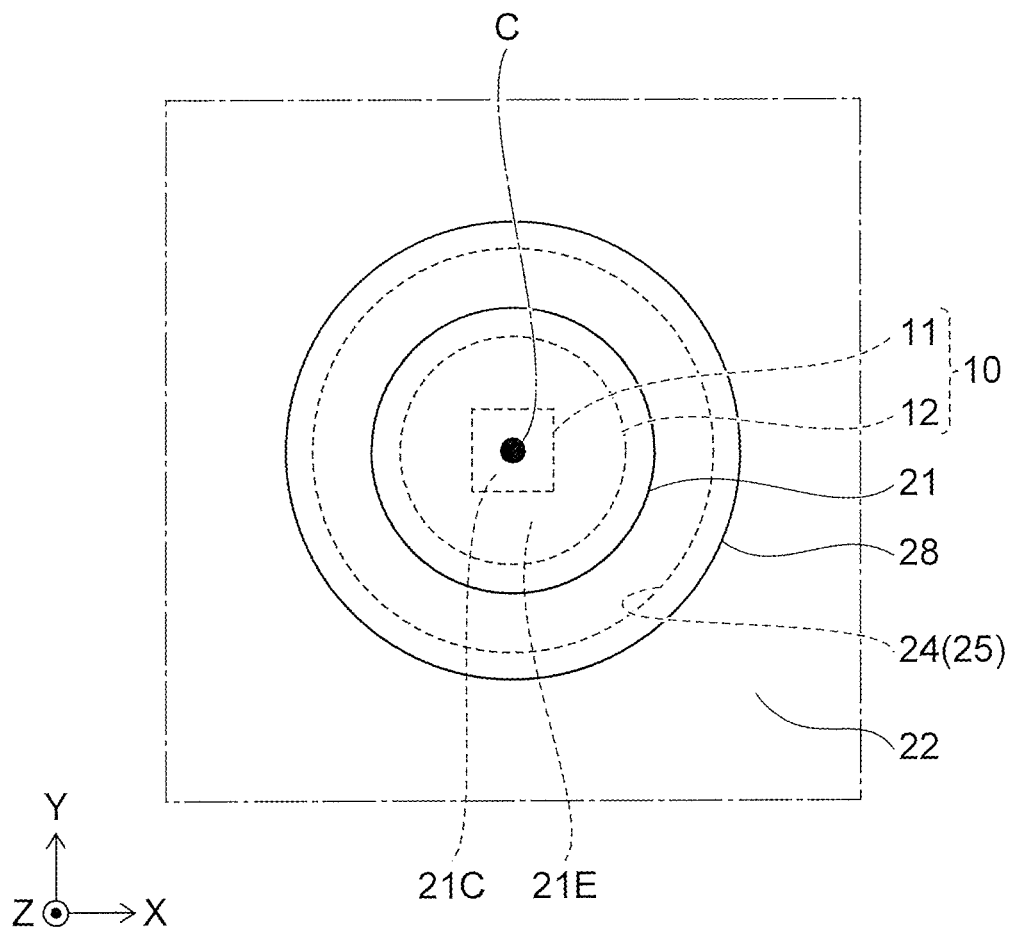
FIG. 2 is a partially enlarged top view showing region II of FIG. 1.

FIG. 2 is a partially enlarged top view showing region II of FIG. 1.

Figure 3:
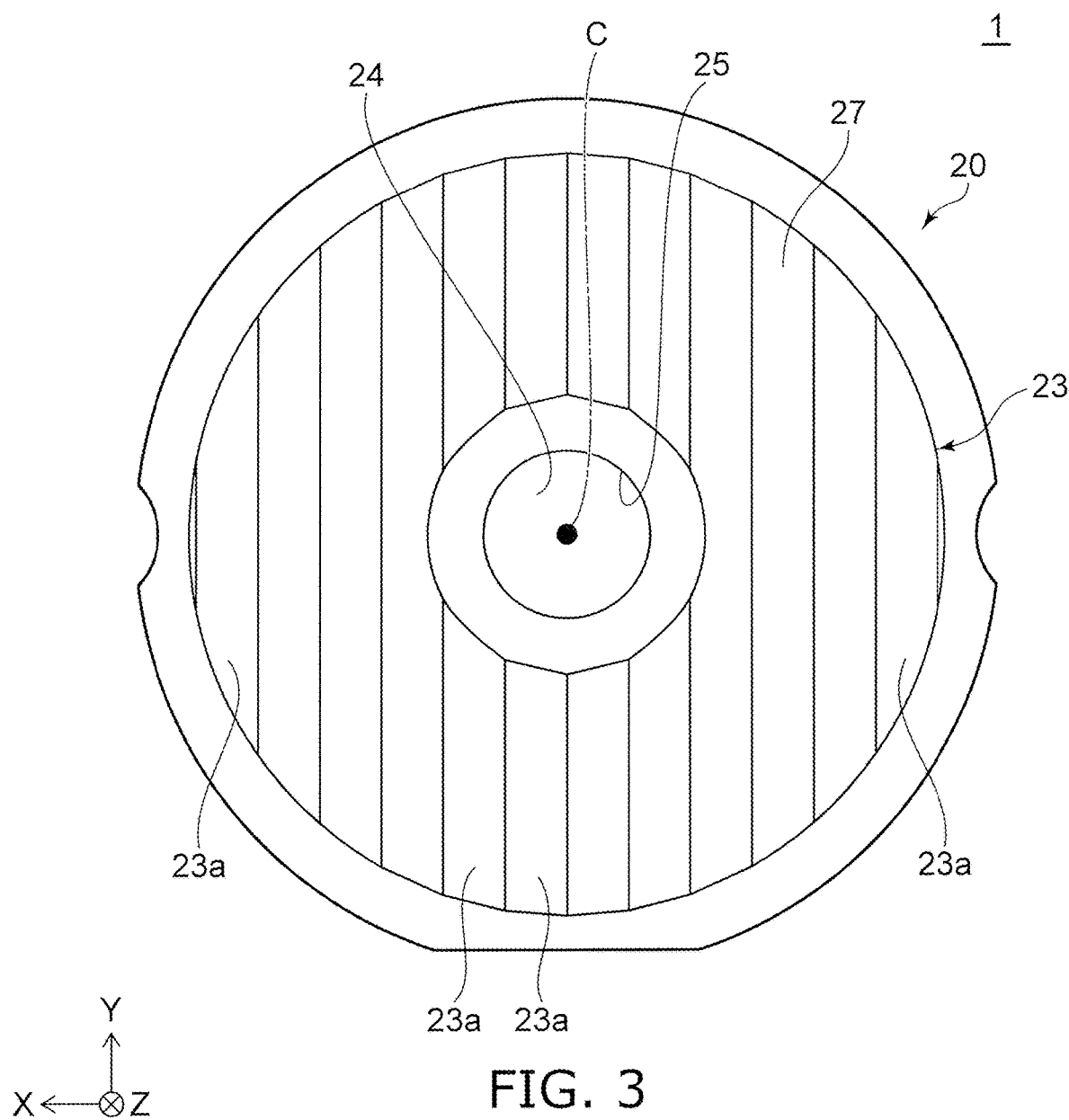
FIG. 3 is a bottom view showing the light-emitting device according to the first embodiment.

FIG. 3 is a bottom view showing the light-emitting device according to the present embodiment.

Figure 4:
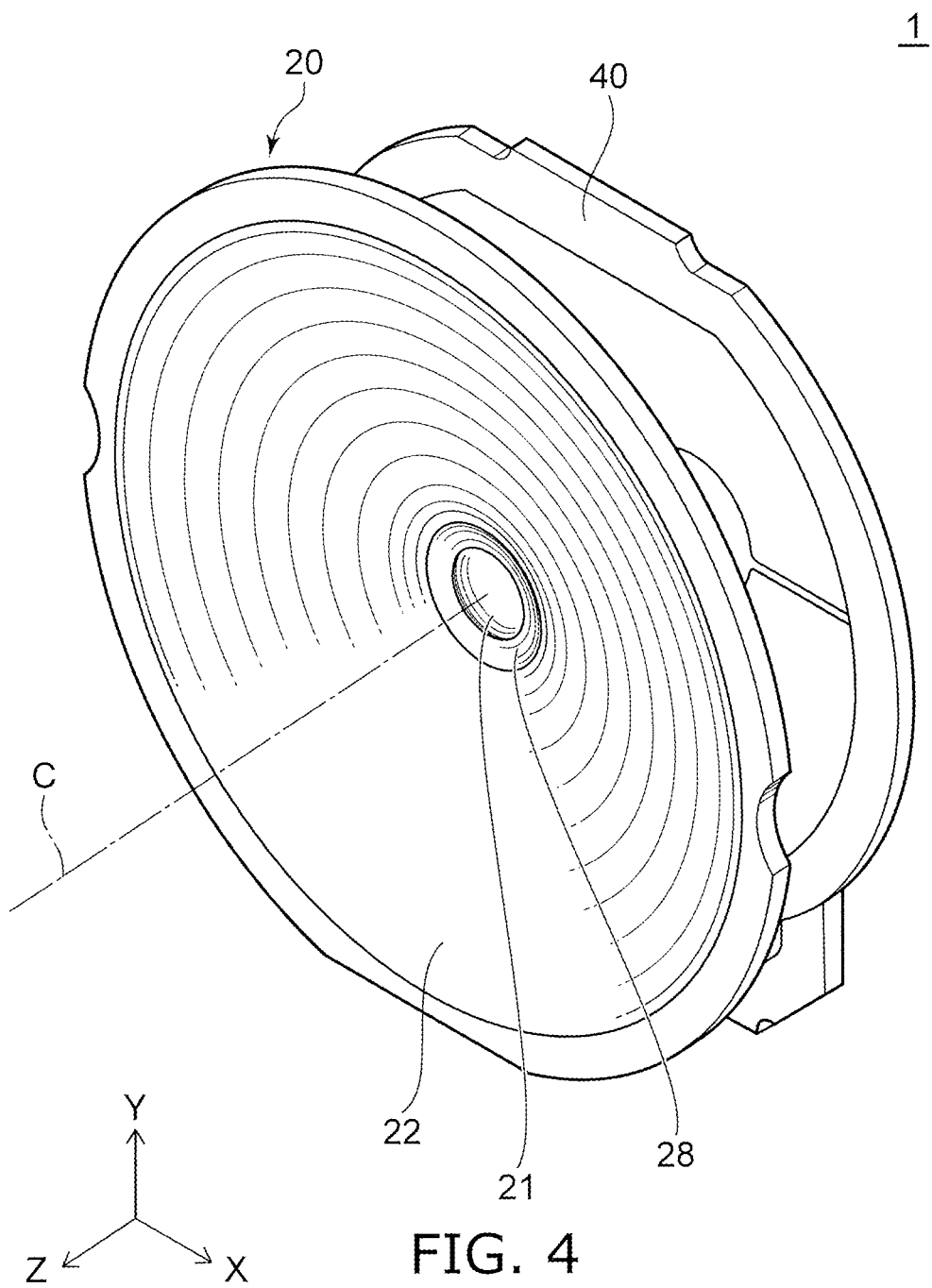
FIG. 4 is a perspective view showing the light-emitting device according to the first embodiment.

FIG. 4 is a perspective view showing the light-emitting device according to the present embodiment.

Figure 5:
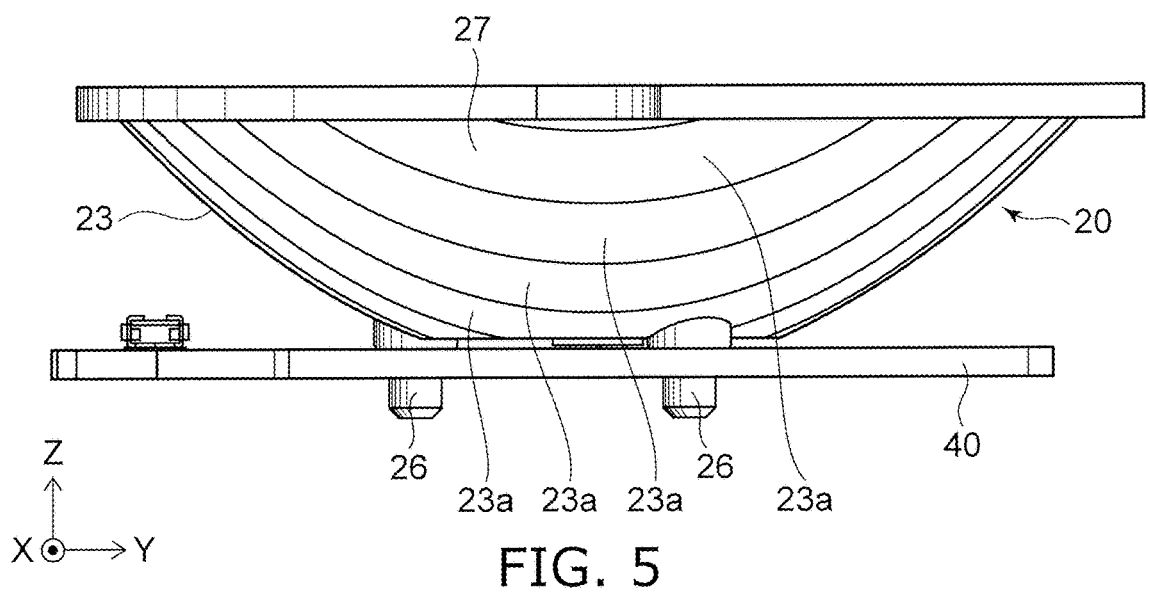
FIG. 5 is a side view showing the light-emitting device according to the first embodiment.

FIG. 5 is a side view showing the light-emitting device according to the present embodiment.

Figure 6:
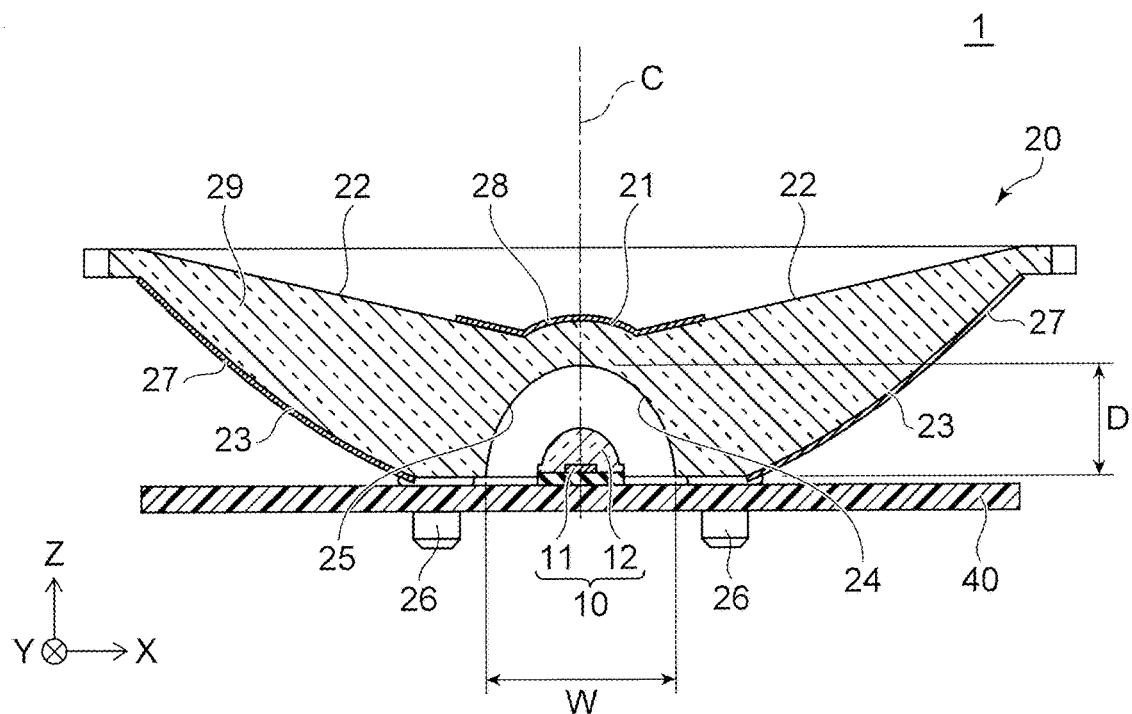
FIG. 6 is a cross-sectional view along line VI-VI shown in FIG. 1.

FIG. 6 is a cross-sectional view along line VI-VI shown in FIG. 1.

Figure 7:
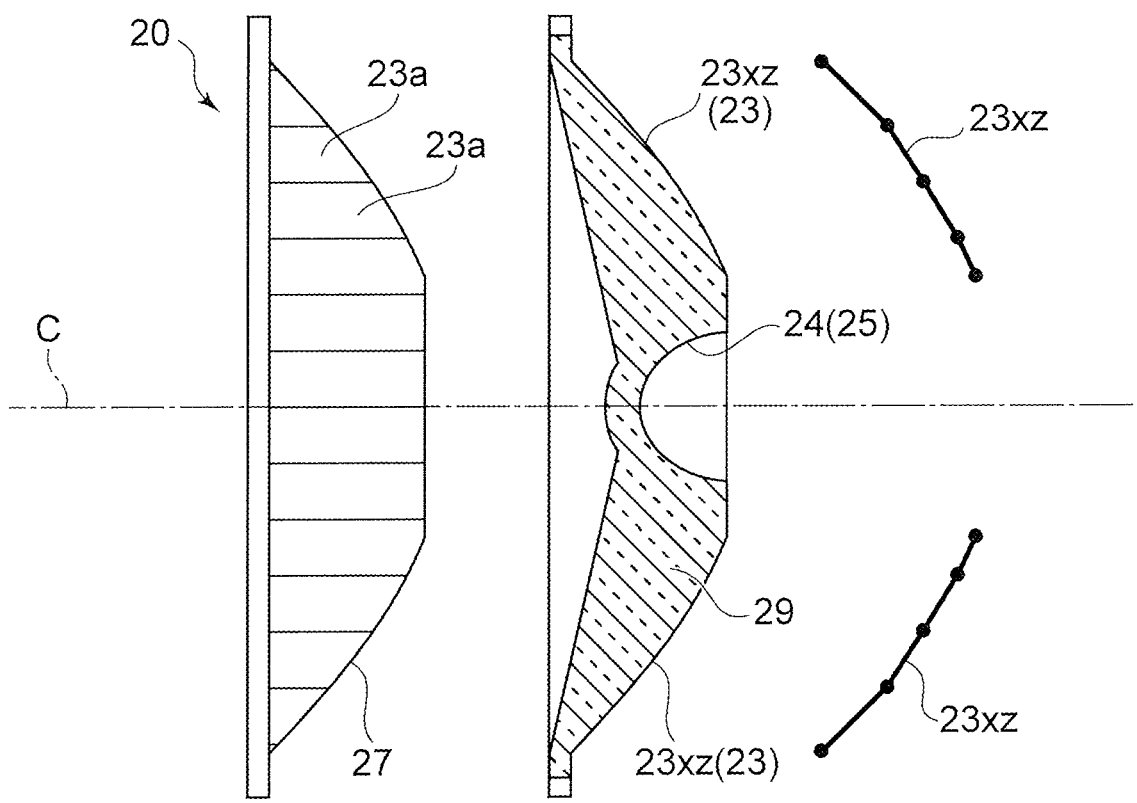
FIG. 7 is a side view and a cross-sectional view showing the light-emitting device according to the first embodiment, and lines illustrating the cross section of a third region.

FIG. 7 is a side view and a cross-sectional view showing the light-emitting device according to the present embodiment, and lines illustrating the cross section of a third region.

Figure 8:
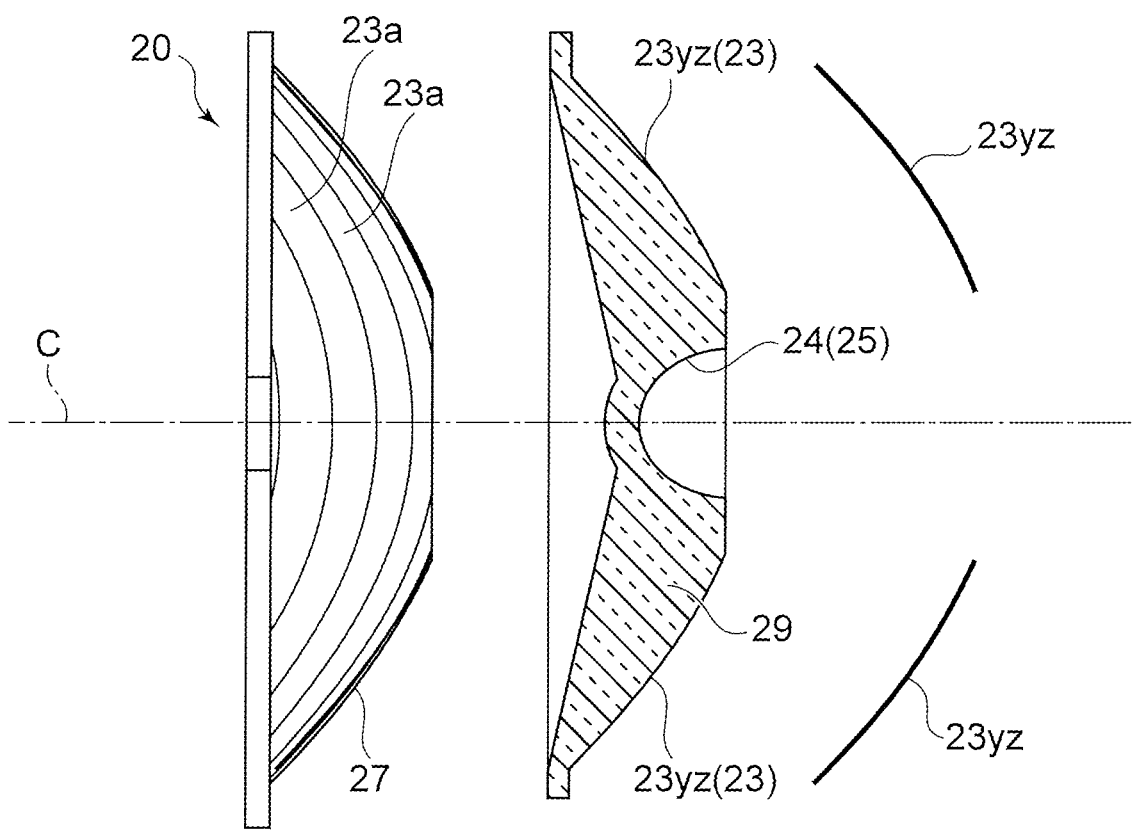
FIG. 8 is a side view and a cross-sectional view showing the light-emitting device according to the first embodiment, and lines illustrating the cross section of the third region.

FIG. 8 is a side view and a cross-sectional view showing the light-emitting device according to the present embodiment, and lines illustrating the cross section of the third region.

The drawings are schematic, and are enhanced or simplified as appropriate. The dimensional ratios and aspect ratios do not necessarily match exactly between the drawings, even for the same component. There are also cases where an end view showing only a cross section is used as a cross-sectional view. This is similar for the other drawings described below as well.

Schematic Configuration of Light-Emitting Device

A configuration of a light-emitting device according to the present embodiment will now be described schematically.

As shown in FIGS. 1 to 8, the light-emitting device 1 according to the present embodiment includes a light source 10 and an optical element 20. The light source 10 includes a light-emitting element 11. The light source 10 has an optical axis C extending in a first direction Z.

An XYZ orthogonal coordinate system is employed for convenience of description in the specification hereinbelow. The direction in which the optical axis C of the light source 10 extends will be referred to as a "first direction Z". Two mutually-orthogonal directions orthogonal to the first direction Z will be referred to as a "second direction X" and a "third direction Y". Further, in the description below, the first direction Z will also be referred to as "up/above", and the direction opposite to the first direction Z will also be referred to as "down/below", but these expressions are for convenience and are independent of the direction of gravity. For example, although the first direction Z is a major travel direction of the light emitted from the light-emitting device 1, when the light-emitting device 1 is used in a lighting device for dental treatment as described below, the light is emitted obliquely downward in many cases.

Figure 9:
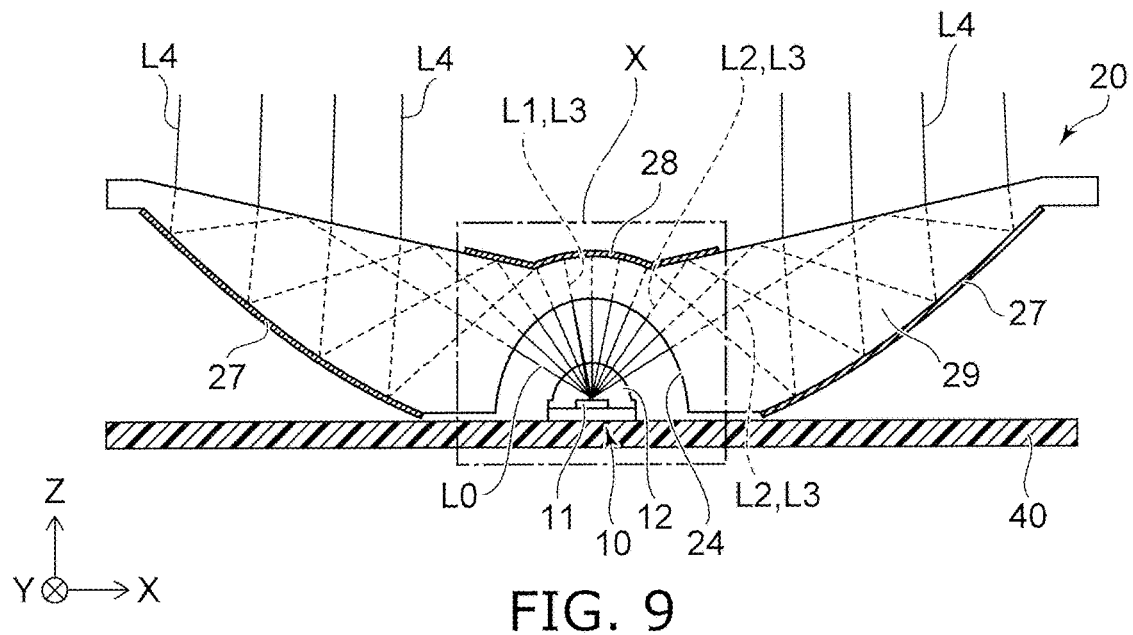
FIG. 9 is a ray diagram showing an operation of the light-emitting device according to the first embodiment.

The surface of the optical element 20 includes an incident region 24, a first region 21, a second region 22, and a third region 23. As shown in FIG. 9, a light L0 that is emitted from the light source 10 is incident on the incident region 24. The first region 21 is positioned at the side opposite to the incident region 24. The first region 21 is larger than the light-emitting element 11 when viewed in the first direction Z. A first light L1 that enters the optical element 20 through the incident region 24 is reflected by the first region 21 toward the light source 10. When the first region 21 is divided into a central region 21C, overlapping the light-emitting element 11 when viewed in the first direction Z, and an outer region 21E, positioned outside the central region 21C, the first region 21 reflects both the first light L1 that reaches the central region 21C and the first light L1 that reaches the outer region 21E toward the light source 10.

The second region 22 is a ring-shaped region surrounding the first region 21. A second light L2 that enters the optical element 20 through the incident region 24 is reflected by the second region 22 toward the third region 23. The third region 23 is a ring-shaped region surrounding the incident region 24. The second light L2 that is reflected by the second region 22 is reflected by the third region 23 toward the second region 22. The light that is reflected by the third region 23 is emitted from the second region 22. The first light L1 and the second light L2 include the light L0 emitted from the light source 10 and a third light L3 that is reflected by the light source 10 after being reflected by the first region 21.

Detailed Configuration of Light-Emitting Device

A configuration of the light-emitting device 1 according to the present embodiment will now be described in detail. Parts of the following description overlap the schematic description above. The configuration described below is an example; and the invention is not limited thereto.

As shown in FIGS. 4 to 6, the light-emitting device 1 can include a substrate 40 in addition to the light source 10 and the optical element 20 described above. The substrate 40 is, for example, a printed circuit board (PCB), and is, for example, an aluminum-based rigid substrate. The light source 10 is mounted to the substrate 40. In FIGS. 3, 7, and 8, the substrate 40 is not illustrated to facilitate understanding of the drawing.

As shown in FIG. 6, the light source 10 can include a sealing member 12 in addition to the light-emitting element 11. Electricity is supplied to the light-emitting element 11 via the substrate 40. The light-emitting element 11 is, for example, a light-emitting diode (LED). As shown in FIGS. 2 and 6, when viewed in the first direction Z, the light-emitting element 11 is rectangular, e.g., square. When viewed in the first direction Z, the four sides of the light-emitting element 11 extend in the second and third directions X and Y.

Figure 10:
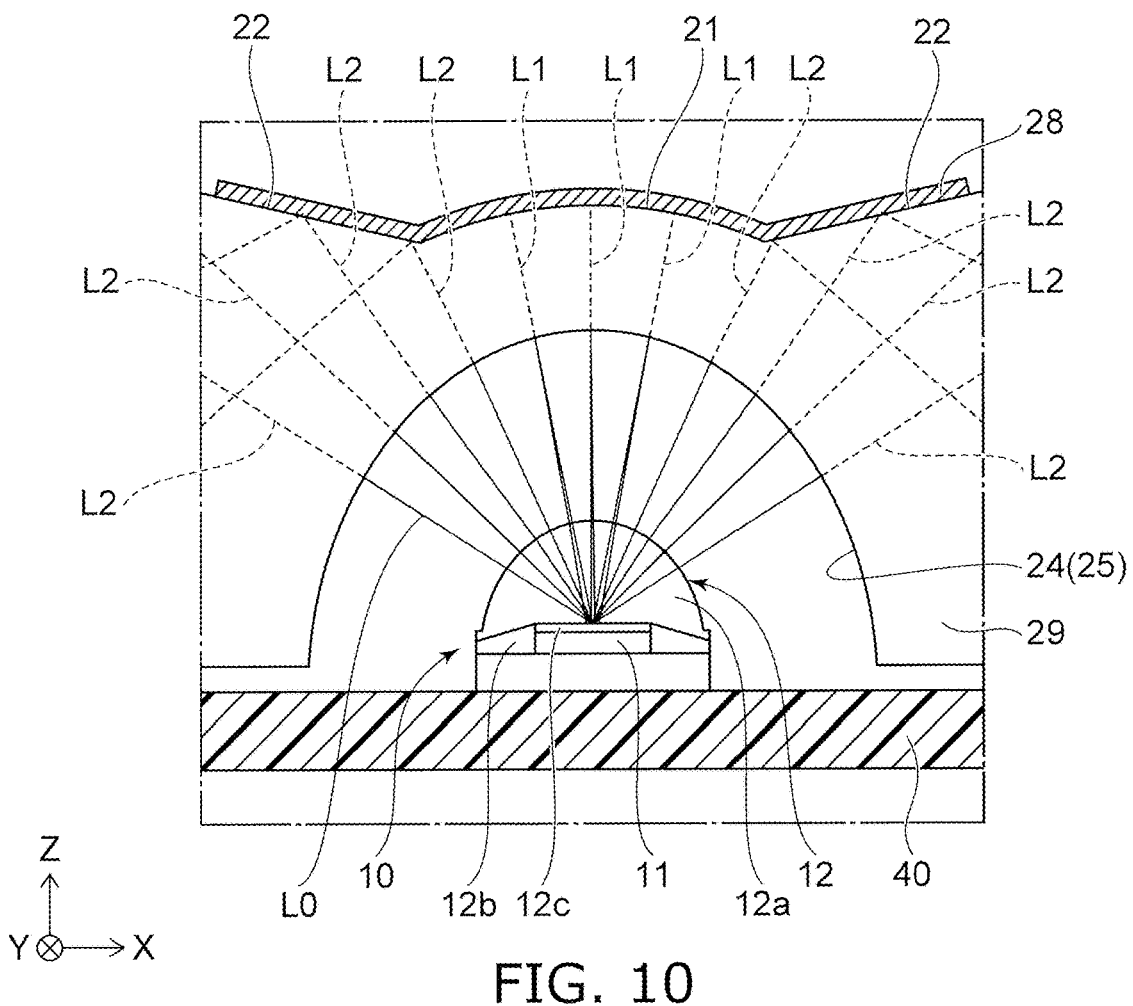
FIG. 10 shows region X of FIG. 9.

The sealing member 12 is located on the light-emitting element 11. For example, the sealing member 12 has a dome shape that is convex in the first direction Z. As shown in FIG. 10, the sealing member 12 includes a light-transmitting part 12a, a reflecting part 12b, and a wavelength conversion part 12c. The wavelength conversion part 12c covers the upper surface of the light-emitting element 11. The reflecting part 12b covers the side surfaces of the light-emitting element 11. The light-transmitting part 12a covers the light-emitting element 11, the reflecting part 12b, and the wavelength conversion part 12c. The light-transmitting part 12a is made of a light-transmitting resin material. The wavelength conversion part 12c includes a phosphor. For example, the light-emitting element 11 emits blue light; and the phosphor that is included in the wavelength conversion part 12c absorbs a portion of the blue light emitted from the light-emitting element 11 and radiates yellow light. Accordingly, the light L0 that is emitted from the light source 10 is white light in which the blue light and the yellow light are mixed. The sealing member 12 does not necessarily include the reflecting part 12b.

As shown in FIGS. 4 to 6, the optical element 20 is fixed to the substrate 40. The light source 10 is also fixed to the substrate 40, so that the optical element 20 is fixed with respect to the light source 10. The shape of the optical element 20 is substantially a solid of revolution with the optical axis C of the light source 10 serving as the rotation axis. Accordingly, the optical element 20 is substantially circular when viewed in the first direction Z. However, as described below, the third region 23 is anisotropic between the second direction X and the third direction Y.

As shown in FIGS. 3 and 6, the incident region 24 and the third region 23 are located at the lower surface of the optical element 20. The incident region 24 is a region whose center is the center of the lower surface of the optical element 20, i.e., the intersection between the lower surface and the optical axis C. The incident region 24 is a surface including a concave curved surface. A recess 25 is defined by the incident region 24 of the lower surface of the optical element 20. The light source 10 is located inside the recess 25. As shown in FIG. 6, it is favorable for a depth D of the recess 25 to be greater than a width W of the opening of the recess 25 in a cross section including the optical axis C of the light source 10. In other words, it is favorable for D>W.

The third region 23 of the optical element 20 is a ring-shaped region surrounding the incident region 24. For example, the third region 23 is separated from the incident region 24. The third region 23 is tilted with respect to the substrate 40 such that the farther a portion of the third region 23 is away from the incident region 24, the higher the portion is located.

The third region 23 is subdivided into multiple subregions 23a along the second direction X. Each subregion 23a has a band shape in which the third direction Y is the longitudinal direction thereof. In the second direction X, each subregion 23a is substantially not curved, and is substantially flat. The adjacent subregions 23a intersect each other. In the third direction Y, each subregion 23a is curved such that the subregion 23a is continuously tilted in the first direction Z.

Therefore, as shown in FIG. 7, the XZ cross section of the third region 23, i.e., a first cross section 23xz that includes the optical axis C of the light source 10 as a first axis and one second axis orthogonal to the first axis is a polygonal line made by connecting multiple line segments; and a cross section of the third region 23 parallel to the first cross section 23xz is a polygonal line made by connecting multiple line segments. The second axis extends in the second direction X. The points at which the multiple line segments meet in the first cross section 23xz are illustrated by black circles.

In contrast, as shown in FIG. 8, the YZ cross section of the third region 23, i.e., a second cross section 23yz that includes the first axis and a third axis orthogonal to the first and second axes is a continuous curve; and a cross section of the third region 23 parallel to the second cross section 23yz is a continuous curve. The third axis extends in the third direction Y.

The lower surface of the optical element 20 has two or more, e.g., three, protrusions 26 in the region between the incident region 24 and the third region 23. In such a case, through-holes are provided in the substrate 40 at positions each corresponding to a respective one of the protrusions 26. The optical element 20 is fixed to the substrate 40 by the three protrusions 26 each extending through a respective one of the three through-holes of the substrate 40. The protrusions 26 are not illustrated in FIGS. 3, 7, and 8. The optical element 20 can be fixed to the substrate 40 by another configuration.

As shown in FIGS. 1 to 6, the first region 21 and the second region 22 are located at the upper surface of the optical element 20. The first region 21 is a region whose center is the center of the upper surface of the optical element 20, i.e., the intersection between the upper surface and the optical axis C. According to the present embodiment, the first region 21 can be a convex curved surface, a portion of a spherical surface, an aspherical surface, or a curved surface combining an aspherical surface and a portion of a spherical surface. For example, it is favorable for the first region 21 to be a portion of an aspherical surface whose center corresponds to one point within the light-emitting element 11. The first region 21 is, for example, a surface of revolution with the optical axis C of the light source 10 serving as the rotation axis; and the shape of the convex curved surface when viewed in the first direction Z is circular.

The second region 22 is a ring-shaped region surrounding the first region 21, and is in contact with the first region 21. The second region 22 is tilted with respect to the substrate 40 such that the farther a portion of the second region 22 is away from the first region 21, the higher the portion is located. The angle between the substrate 40 and the second region 22 is less than the angle between the substrate 40 and the third region 23. Therefore, the more distant to the optical axis C, the less the distance between the second region 22 and the third region 23 approach each other, and a thickness of the optical element 20 is gradually reduced in the first direction Z. The angle between the substrate 40 and the second region 22 is the angle between the upper surface of the substrate 40 and a line segment connecting the upper end and lower end of the second region 22 in a cross section including the optical axis C. The angle between the substrate 40 and the third region 23 is the angle between the upper surface of the substrate 40 and a line segment connecting the upper end and lower end of the third region 23 in a cross section including the optical axis C.

The optical element 20 includes a light-transmitting member 29, a metal member 28, and a reflecting member 27. The light-transmitting member 29 is made of a light-transmitting material such as, for example, a light-transmitting resin material, and is formed of, for example, a polymethyl methacrylate (PMMA) resin. The main part of the optical element 20 includes the light-transmitting member 29.

The metal member 28 is, for example, aluminum or silver. The metal member 28 continuously covers the light-transmitting member 29 in the entire first region 21 and at a part of the second region 22 in contact with the first region 21. The metal member 28 is circular when viewed in the first direction Z.

The reflecting member 27 is also, for example, an aluminum thin film or a silver thin film. The reflecting member 27 covers the light-transmitting member 29 in the third region 23. The reflecting member 27 is ring-shaped when viewed in the first direction Z. The metal member 28 and the reflecting member 27 are not illustrated for convenience of illustration in the cross-sectional view of FIG. 7 and the cross-sectional view of FIG. 8.

As shown in FIG. 2, when viewed in the first direction Z, the outer edge of the metal member 28 is positioned outward of the outer edge of the incident region 24; the outer edge of the incident region 24 is positioned outward of the outer edge of the first region 21; the outer edge of the first region 21 is positioned outward of the outer edge of the light source 10; and the outer edge of the light source 10 is positioned outward of the outer edge of the light-emitting element 11. Accordingly, the first region 21 is larger than the light-emitting element 11 when viewed in the first direction Z.

Operations

Operations of the light-emitting device 1 according to the present embodiment will now be described.

FIG. 9 is a ray diagram showing an operation of the light-emitting device according to the present embodiment.

FIG. 10 shows region X of FIG. 9.

Figure 11:
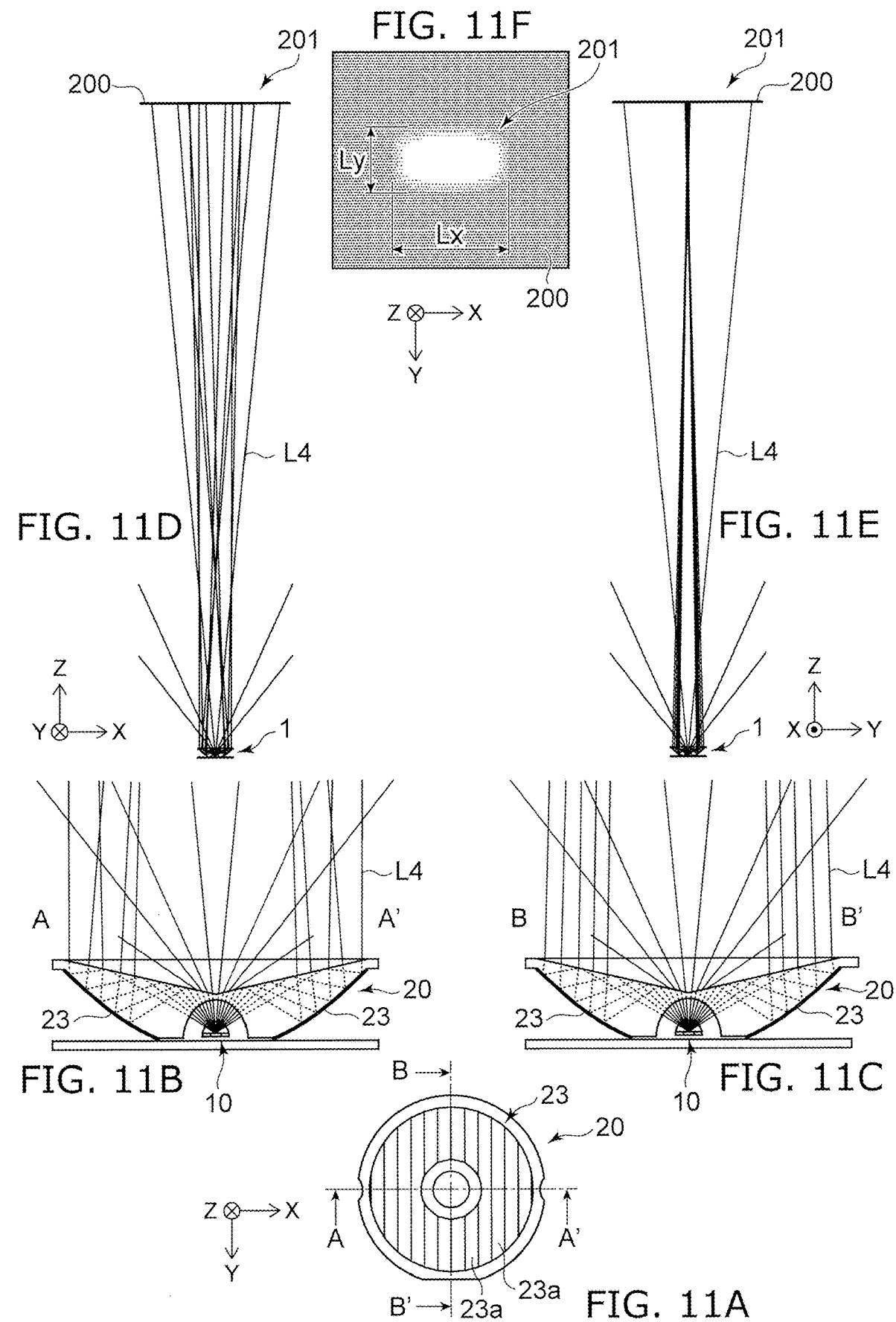
FIGS. 11A to 11E include a bottom view showing the light-emitting device according to the first embodiment (FIG. 11A), a cross-sectional view along line A-A' of the bottom view (FIG. 11B), a cross-sectional view along line B-B' of the bottom view (FIG. 11C), drawings showing portions of the trajectory of the light from the light-emitting device to the irradiation region (FIGS. 11D and 11E), and a drawing showing the irradiation region at the imaging surface (FIG. 11F)

FIGS. 11A to 11E include a bottom view showing the light-emitting device according to the present embodiment (FIG. 11A), a cross-sectional view along line A-A' of the bottom view (FIG. 11B), a cross-sectional view along line B-B' of the bottom view (FIG. 11C), drawings showing portions of the trajectory of the light from the light-emitting device to the irradiation region (FIGS. 11D and 11E), and a drawing showing the irradiation region at the imaging surface (FIG. 11F).

As shown in FIG. 10, for example, the light-emitting element 11 emits blue light when power is supplied to the light-emitting element 11 via the substrate 40. The phosphor that is included in the wavelength conversion part 12c absorbs a portion of the blue light and radiates, for example, yellow light. As a result, a white light L0 in which the blue light and the yellow light are mixed is emitted from the light source 10.

As shown in FIGS. 9 and 10, the light L0 that is emitted from the light source 10 enters the light-transmitting member 29 of the optical element 20 via the incident region 24. When the incident region 24 is a concave curved surface, the incident angle of the light L0 with respect to the incident region 24 is stably less than the critical angle, so that the efficiency of the incidence is increased.

The light L0 that enters the optical element 20 through the incident region 24 mainly travels toward the first and second regions 21 and 22. Among the light L0, the light traveling toward the first region 21 will be referred to as the first light L1; and the light traveling toward the second region 22 will be referred to as the second light L2.

The first region 21 is a convex curved surface; and the metal member 28 that covers the light-transmitting member 29 is located on the first region 21; therefore, the first region 21 retroreflects the first light L1. In other words, the greater part of the first light L1 is reflected toward the light source 10 by the interface between the light-transmitting member 29 and the metal member 28 in the first region 21. Accordingly, both the first light L1 reaching the central region 21C of the first region 21 and the first light L1 reaching the outer region 21E are reflected toward the light source 10. When the first region 21 is a surface of revolution with the optical axis C of the light source 10 serving as the rotation axis, the first light L1 is reflected toward the light-emitting element 11 inside the light source 10, and thus the accuracy of the retroreflection is high.

The second light L2 is incident on the second region 22 at a larger incident angle than the critical angle, so that the second light L2 is totally reflected by the second region 22. The second light L2 that is totally reflected by the second region 22 travels toward the third region 23. The reflecting member 27 that covers the light-transmitting member 29 is located in the third region 23, so that the third region 23 reflects the second light L2 emitted from the second region 22 toward the second region 22. The second light L2 that reaches the second region 22 from the third region 23 is incident on the second region 22 at a smaller incident angle than the critical angle, and is therefore emitted outside the optical element 20 via the second region 22.

On the other hand, the first light L1 that is retroreflected by the first region 21 and returns to the light source 10 is reflected by the light source 10. More specifically, the first light L1 is reflected by the surface of the sealing member 12, scattered by the phosphor included in the wavelength conversion part 12c, radiated after being converted into light of a different wavelength by the phosphor included in the wavelength conversion part 12c, reflected by the surface of the light-emitting element 11, or reflected by another member included in the light source 10. Thus, the light that is reflected, scattered, radiated, etc., by the light source 10 is generally referred to as the "third light L3".

The third light L3 becomes a portion of the first and second light L1 and L2, and is reused. In other words, the first light L1 and the second light L2 each include light emitted from the light source 10 by light emission of the light-emitting element 11, and the third light L3 reflected by the light source 10 after being reflected by the first region 21. The light that is emitted from the optical element 20 via the second region 22 will be referred to as a "fourth light L4". The fourth light L4 is the light emitted by the light-emitting device 1.

As shown in FIG. 11A, the third region 23 is divided into the multiple subregions 23a along the second direction X. Therefore, the first cross section 23xz of the third region 23 is parallel to the second direction X and is a polygonal line as shown in FIG. 7; and the second cross section 23yz of the third region 23 is parallel to the third direction Y and is a continuous curve as shown in FIG. 8. Thus, the shape of the third region 23 is anisotropic between the second direction X and the third direction Y.

Therefore, in the second direction X as shown in FIGS. 11B and 11D, the reflected angle is gradually varied among each subregion 23a, so that the fourth light L4 is diffused. On the other hand, in the third direction Y as shown in FIGS. 11C and 11E, the fourth light L4 that is emitted along the first direction Z from the optical element 20 is not diffused very much, and converges at an imaging surface 200.

As a result, the fourth light L4 is spread along the second direction X at the imaging surface 200. As a result, as shown in FIG. 11F, the shape of an irradiation region 201 of the fourth light L4 at the imaging surface 200 is a substantially rectangular shape having a length Lx along the second direction X that is greater than a length Ly along the third direction Y.

If the third region 23 was not anisotropic as described above and was a perfect solid of revolution, the shape of the irradiation region 201 at the imaging surface 200 would reflect the shape of the light-emitting element 11. For example, when the light-emitting element 11 is square when viewed in the first direction Z, the irradiation region 201 also would be substantially square.

Effects

In the light-emitting device 1 according to the present embodiment, the light L0 that is emitted from the light source 10 enters the optical element 20 through the incident region 24, is totally reflected by the second region 22, is reflected by the third region 23, and is emitted from the optical element 20 via the second region 22. As a result, the irradiation region 201 of a predetermined shape can be formed at the imaging surface 200.

The first region 21 reflects, toward the light source 10, both the first light L1 reaching the central region 21C and the first light L1 reaching the outer region 21E; therefore, these lights can be reused by being reflected by the light source 10. Therefore, the light-emitting device 1 has low stray light and a high light utilization efficiency. Stray light refers to the light irradiated on a region outside the irradiation region 201.

In the light-emitting device 1, the first region 21 retroreflects the first light L1. Accordingly, substantially the entire first light L1 is reflected toward the light source 10, which further reduces stray light, so that the light utilization efficiency is further improved.

With the first region 21 being a convex curved surface, the accuracy of the first light L1 reflected toward the light source 10 is increased. Further, with this curved surface being a surface of revolution having a rotation axis coinciding an optical axis C of a light source 10, the greater part of the first light L1 can be reflected toward the light-emitting element 11. As a result, the reflection accuracy of the first light L1 by the first region 21 is further improved. In such a case as well, stray light is reduced, and the light utilization efficiency is increased.

With a structure in which the incident region 24 is concave and the light source 10 is located inside the recess 25 defined by the incident region 24, the light-emitting device 1 can be smaller in the first direction Z. With the depth D of the recess 25 being greater than the width W of the opening of the recess 25 in a cross section including the optical axis C of the light source 10, the light-emitting device 1 can be smaller in the XY-plane as well. With the incident region 24 formed of a concave curved surface, the incident angle of the light L0 emitted from the light source 10 on the incident region 24 is reduced; and the light L0 can be efficiently introduced to the optical element 20. This structure also reduces stray light and increases the light utilization efficiency.

With the optical element 20 including the metal member 28 covering the light-transmitting member 29 in the first region 21, the first light L1 can be reliably reflected by the first region 21. Also, with the metal member 28 continuously covering the first region 21 and a portion of the second region 22, the second light L2 can be reliably reflected also in a region in which the incident angle of the second light L2 on the second region 22 is relatively small. With the optical element 20 including the reflecting member 27 covering the light-transmitting member 29 in the third region 23, the second light L2 can be reliably reflected by the third region 23.

The first cross section 23xz of the third region 23 is parallel to the XZ-plane and is a polygonal line made by connecting multiple line segments; and the second cross section 23yz of the third region 23 is parallel to the YZ-plane and is a continuous curve. This structure allows the irradiation region 201 at the imaging surface 200 to be enlarged along the second direction X. As a result, the ratio of the length Lx in the second direction X to the length Ly in the third direction Y of the irradiation region 201 can be appropriately adjusted.

When the light source 10 includes the wavelength conversion part 12c including a phosphor, the color alternatives of the light L0 are increased. For example, the white light L0 can be realized using an LED that emits blue light.

The shape of the incident region 24 can be a shape in which concave surfaces and convex surfaces are combined. For example, a protrusion that protrudes toward the light source 10 can be provided at the top of the recess 25. As a result, the light that is incident on the protrusion is condensed toward the first region 21, so that the first light L1 and the second light L2 can be separated by the incident region 24.

Modification of First Embodiment

Figure 12:
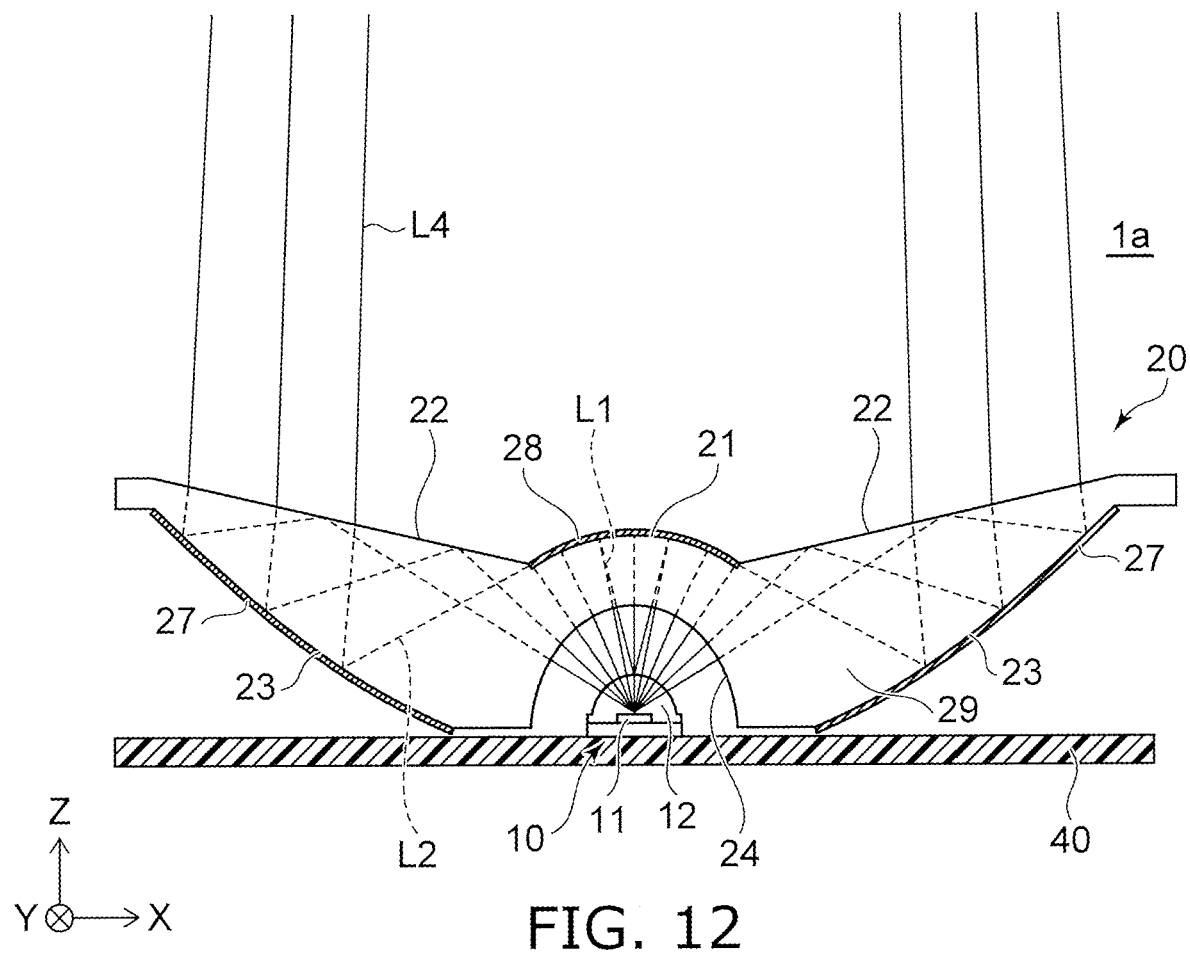
FIG. 12 is a ray diagram showing a light-emitting device according to a modification of the first embodiment.

FIG. 12 is a ray diagram showing a light-emitting device according to a modification.

Components of the modification that are similar to those of the first embodiment are marked with the same reference numerals; and a detailed description is omitted. This is similar for the other embodiments and their modifications described below as well.

As shown in FIG. 12, the light-emitting device 1a according to the modification differs from the light-emitting device 1 according to the first embodiment in that the metal member 28 is located only in the first region 21, and is not located in the second region 22.

When the positional accuracy between the light source 10 and the optical element 20 and the shape accuracy of the light-transmitting member 29 are sufficiently high and the second light L2 entering through the incident region 24 can be totally reflected reliably by the second region 22, effects similar to those of the first embodiment can be obtained by the modification. Other configuration, operations, and effects according to the modification are similar to those of the first embodiment.

Second Embodiment

Figure 13:
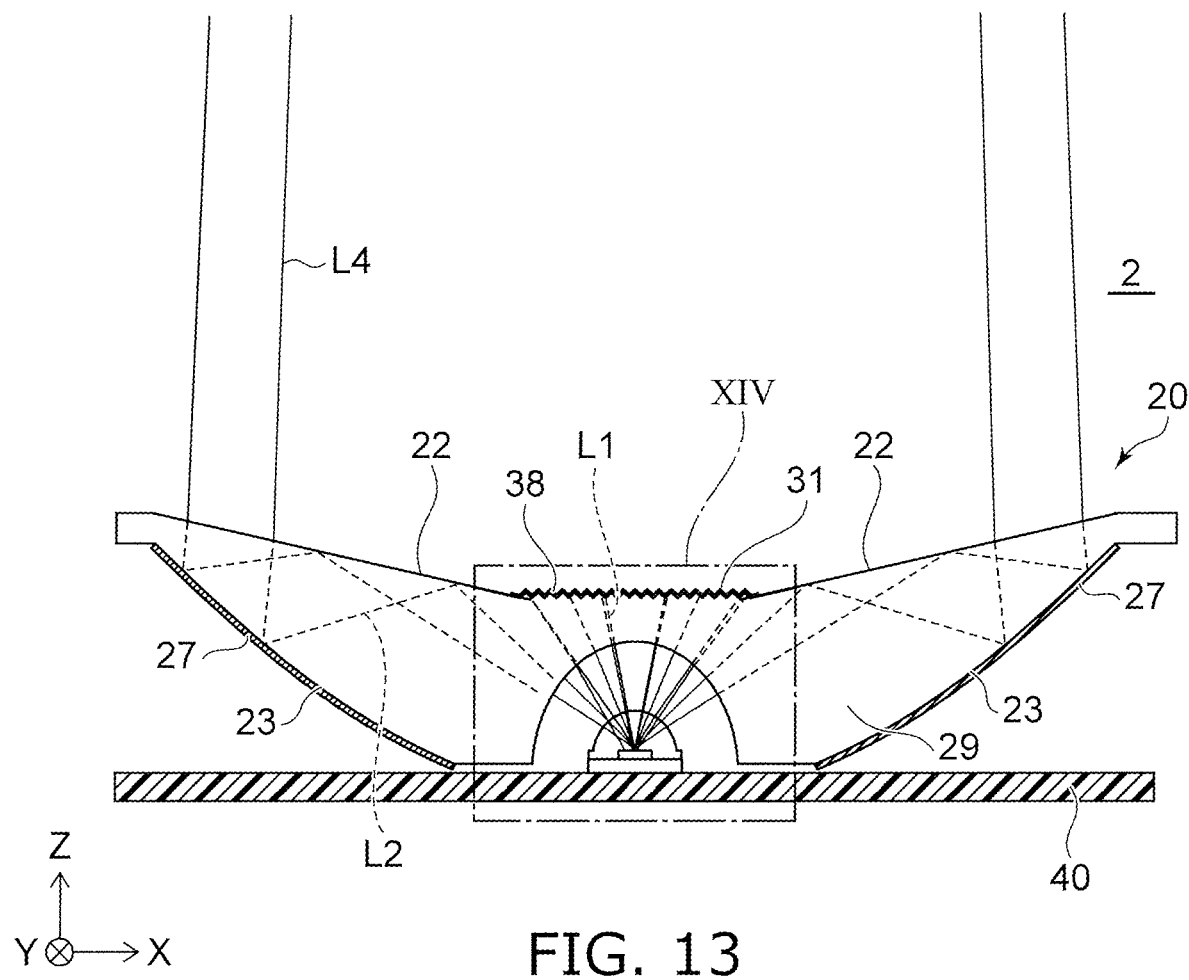
FIG. 13 is a ray diagram showing a light-emitting device according to a second embodiment.

FIG. 13 is a ray diagram showing a light-emitting device according to an embodiment.

Figure 14:
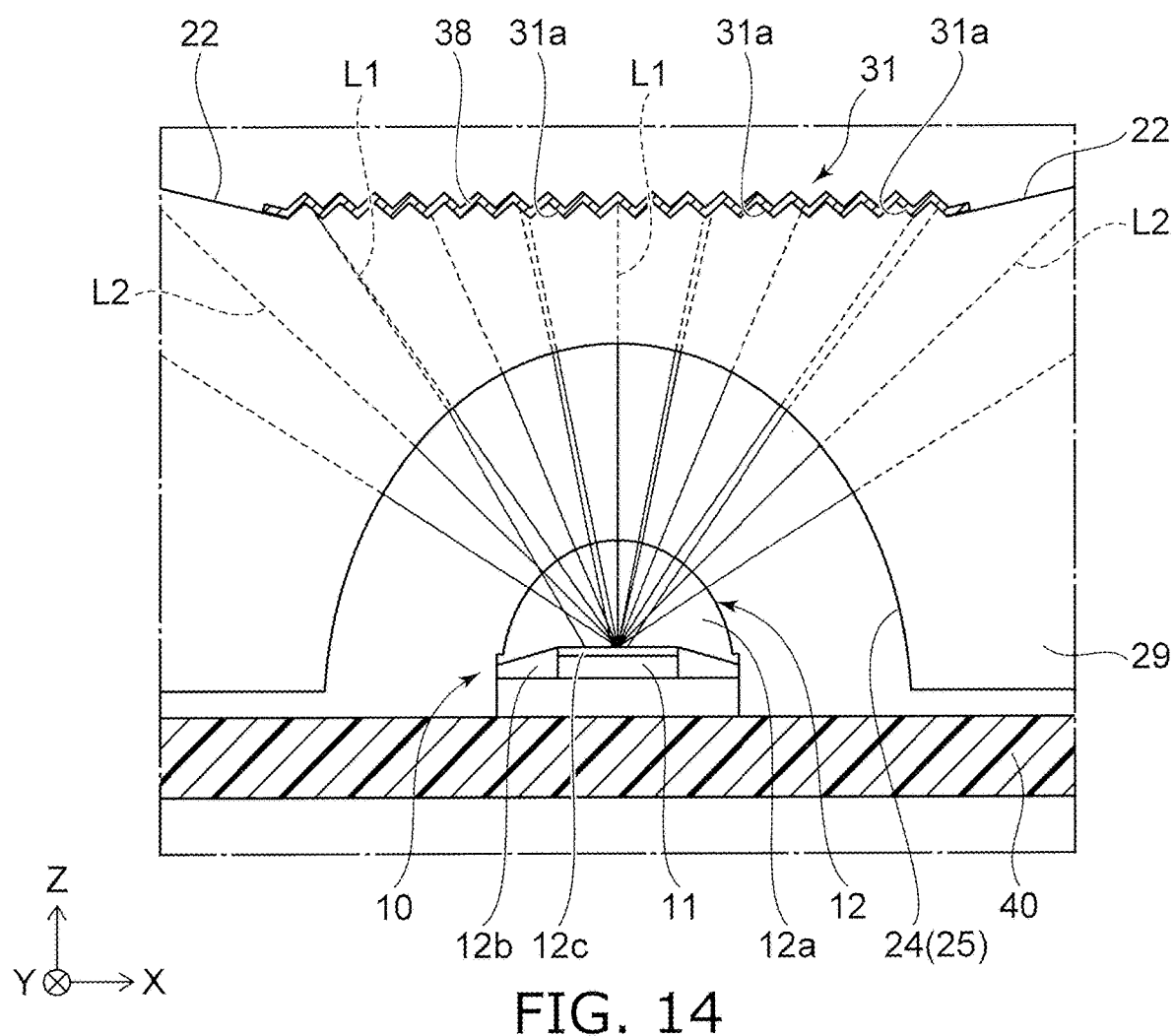
FIG. 14 is a partially enlarged ray diagram showing region XIV of FIG. 13.

FIG. 14 is a partially enlarged ray diagram showing region XIV of FIG. 13.

Figure 15:
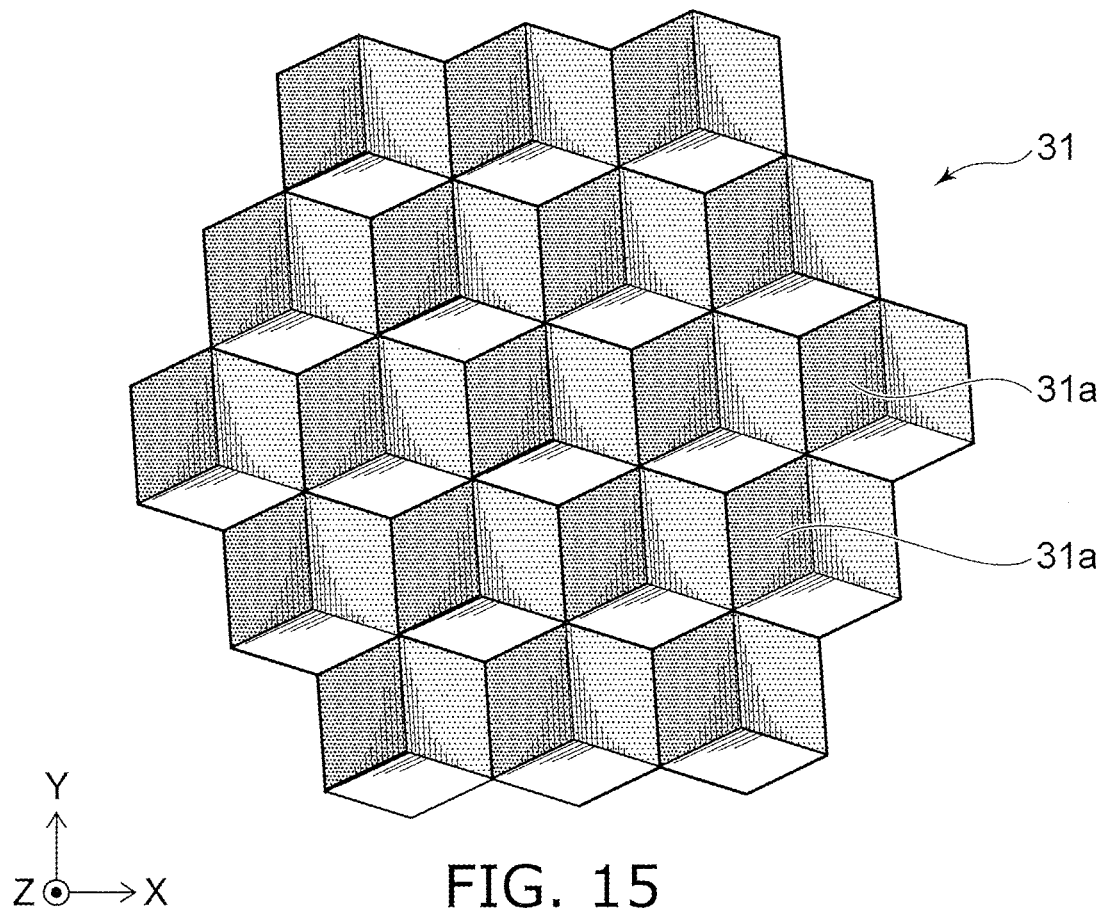
FIG. 15 is a top view showing a first region of the light-emitting device according to the second embodiment.

FIG. 15 is a top view showing the first region of the light-emitting device according to the present embodiment.

Figure 16:
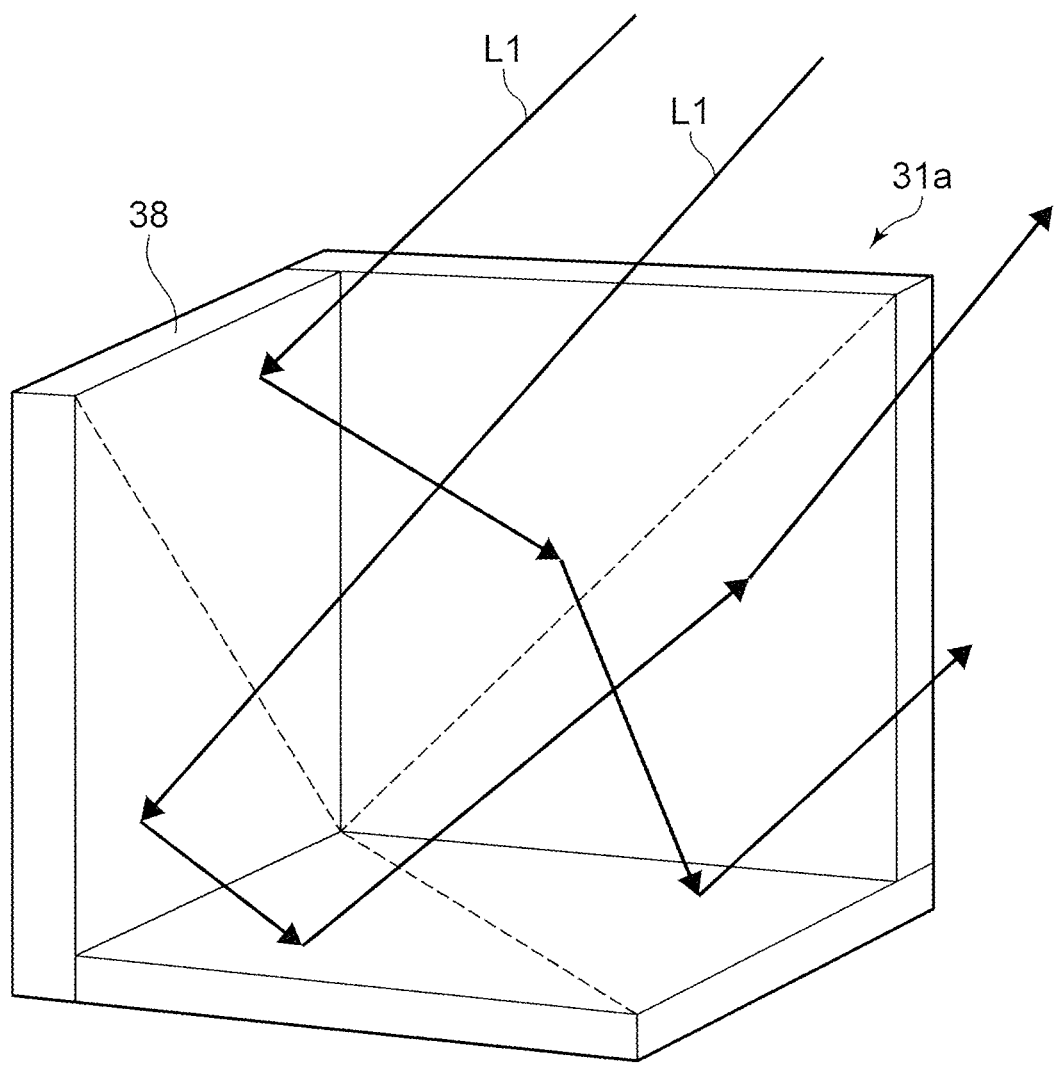
FIG. 16 shows trajectories of light incident on a corner cube.

FIG. 16 shows trajectories of light incident on a corner cube.

In the light-emitting device 2 according to the present embodiment as shown in FIGS. 13 to 16, a first region 31 of the optical element 20 includes multiple corner cubes 31a. Each corner cube 31a is made of three mutually-orthogonal reflecting surfaces. The corner cubes 31a are arranged gaplessly in the first region 31. The first region 31 that includes the multiple corner cubes 31a is substantially flat as an entirety. A metal member 38 is provided at the first region 31. The metal member 38 covers the light-transmitting member 29 in the first region 31. The metal member 38 is, for example, an aluminum thin film or a silver thin film. The metal member 38 is not illustrated in FIGS. 13 and 15.

In the light-emitting device 2, the first light L1 that enters the optical element 20 through the incident region 24 is incident on one of the corner cubes 31a in the first region 31. In general, as shown in FIG. 16, the first light L1 that is incident on the corner cube 31a is sequentially reflected by the three reflecting surfaces of the corner cube 31a, and is emitted toward a direction opposite to the incident direction. There are also cases where, according to the incident direction of the first light L1, the first light L1 is emitted toward the direction opposite to the incident direction after being reflected by only one or two surfaces.

As a result, when the first region 31 is divided into a central region overlapping the light-emitting element 11 and an outer region positioned outside the central region when viewed in the first direction Z, the first region 31 can reflect both the first light L1 reaching the central region and the first light L1 reaching the outer region toward the light source 10. For example, the first region 31 retroreflects the first light L1 toward the light source 10. Other configuration, operations, and effects according to the present embodiment are similar to those of the first embodiment.

Modification of Second Embodiment

Figure 17:
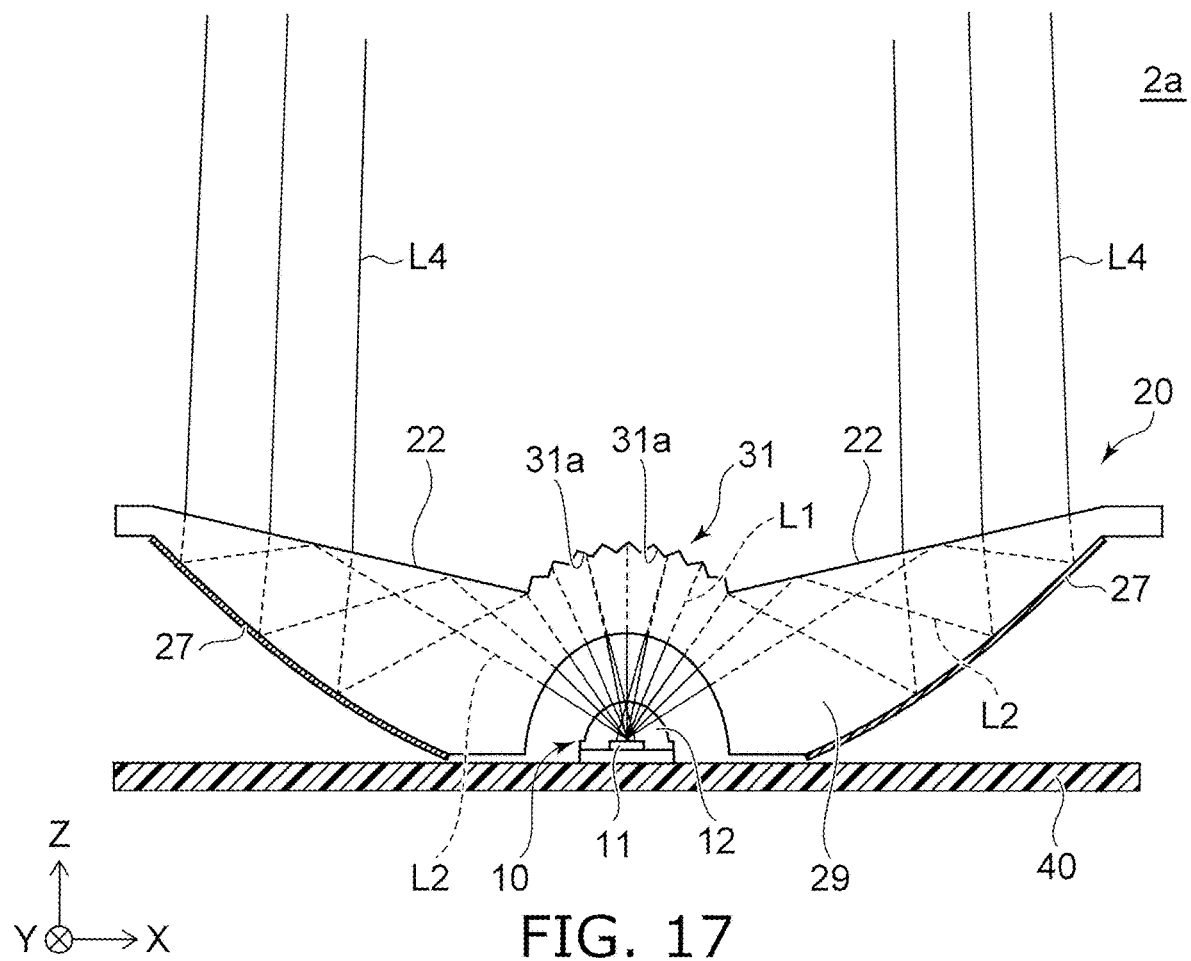
FIG. 17 is a ray diagram showing a light-emitting device according to a modification of the second embodiment.

FIG. 17 is a ray diagram showing a light-emitting device according to a modification.

In the light-emitting device 2a according to the modification as shown in FIG. 17, a virtual curve that connects the vertices of the multiple corner cubes 31a located in the first region 31 is a convex curve; and the metal member 38 is provided at the first region 31. However, the metal member 38 is not illustrated in FIG. 17. With this structure, effects similar to those of the second embodiment can be obtained. Other configuration, operations, and effects according to the present embodiment are similar to those of the second embodiment.

Third Embodiment

Figure 18:
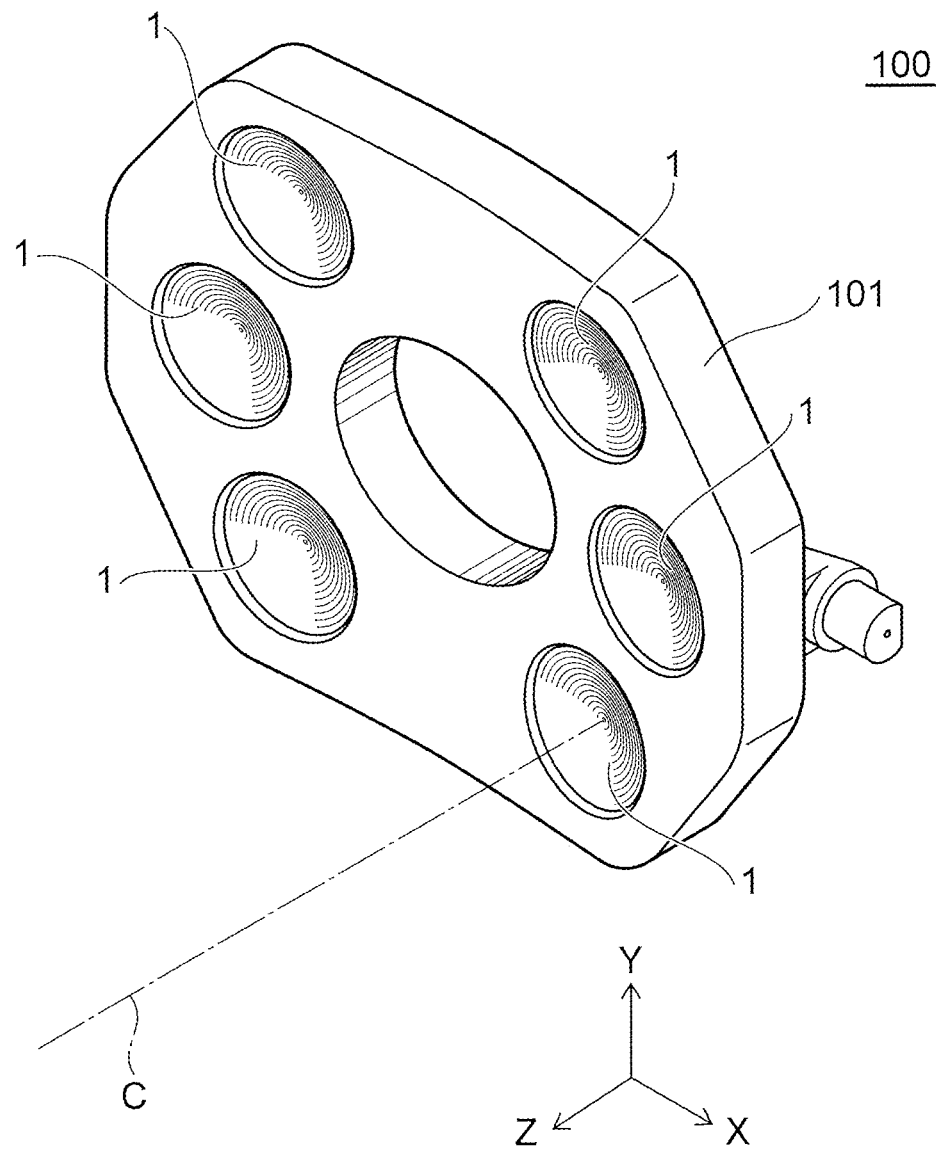
FIG. 18 is a perspective view showing a lighting device according to a third embodiment.

FIG. 18 is a perspective view showing a lighting device according to an embodiment.

Figure 19:
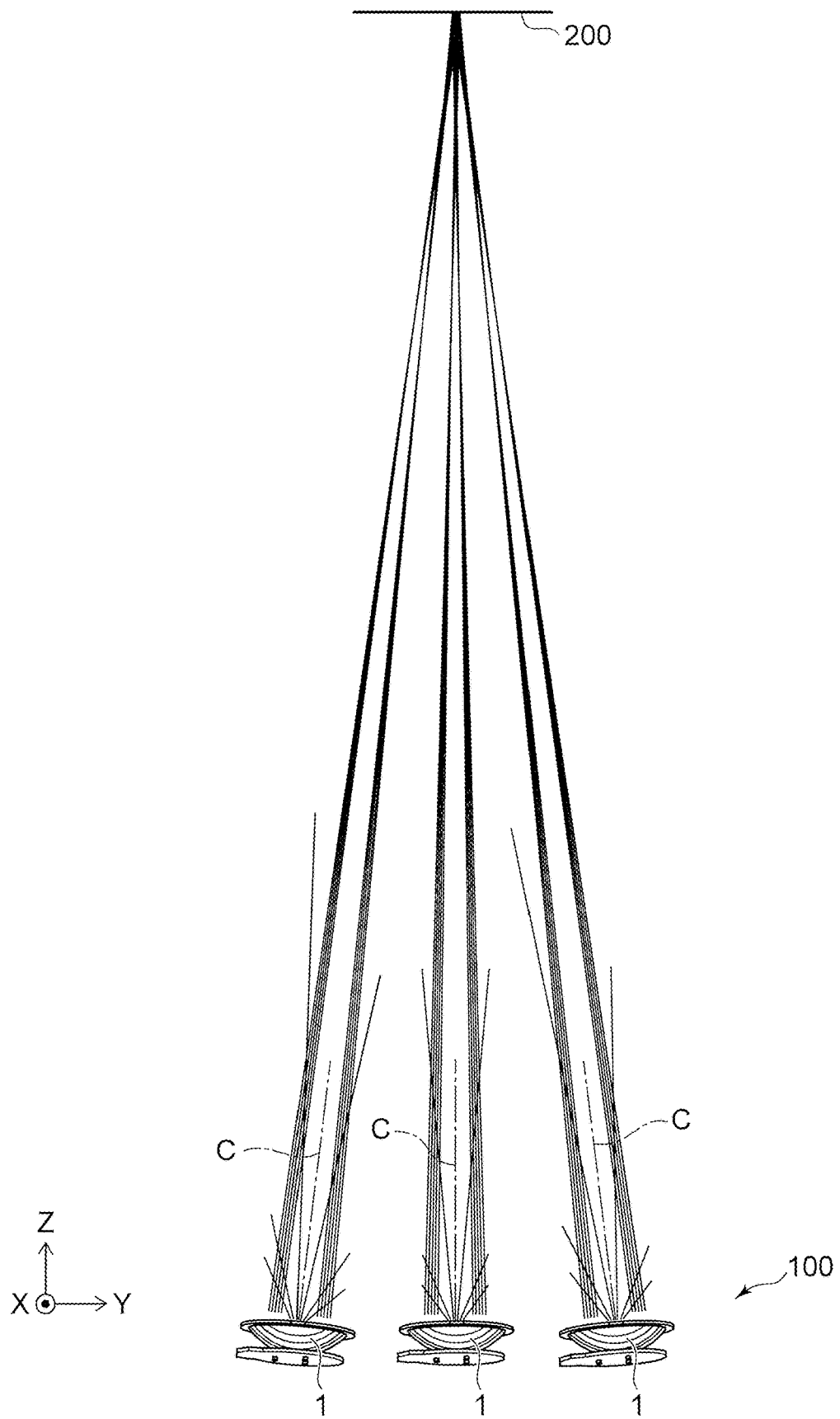
FIG. 19 is a ray diagram showing an operation of the lighting device according to the third embodiment.

FIG. 19 is a ray diagram showing an operation of the lighting device according to the present embodiment.

The present embodiment is a lighting device that utilizes the light-emitting device described above.

As shown in FIG. 18, the lighting device 100 according to the present embodiment includes one or more of the light-emitting devices 1 according to the first embodiment. Instead of the light-emitting device 1, the lighting device 100 can include the light-emitting device 1a according to the modification of the first embodiment, the light-emitting device 2 according to the second embodiment, or the light-emitting device 2a according to the modification of the second embodiment.

The lighting device 100 is a lighting device for dental treatment. The lighting device 100 includes a frame-shaped frame 101 and six light-emitting devices 1. When viewed from the first direction Z side, the surface of the frame 101 is tilted toward the center of the frame 101 in the direction opposite to the first direction Z. Six light-emitting devices 1 are mounted to the frame 101; and power is supplied via the frame 101. The number of the light-emitting devices 1 is not limited to six and can be one or more.

As shown in FIG. 19, the optical axes C of a plurality of light-emitting devices 1 are tilted with respect to each other, and intersect at the imaging surface 200. As a result, the irradiation regions 201 that are formed by the plurality of light-emitting devices 1 overlap each other. In other words, one irradiation region 201 is formed by the plurality of light-emitting devices 1. The distance from the lighting device 100 to the imaging surface 200 is 700 mm according to ISO 9680, and is in a range of 650 mm to 700 mm according to JIS T 5753 which conforms to ISO 9680.

The optical axes C are tilted with respect to each other between the six light-emitting devices 1, and accordingly the XYZ orthogonal coordinates shown in FIGS. 18 and 19 do not exactly match the XYZ orthogonal coordinates shown in FIGS. 1 to 17. In FIGS. 18 and 19, the first direction Z is the direction in which the central axis of the frame 101 extends. This is similar for the modifications described below as well.

According to the present embodiment, by adjusting the positional relationship between the patient and the lighting device 100, the irradiation region 201 of the lighting device 100 is positioned at the mouth of the patient, the second direction X corresponds to the lateral direction of the patient, and the third direction Y corresponds to the longitudinal direction of the patient. As a result, the oral cavity of the patient can be illuminated by the rectangular irradiation region 201 of which the longitudinal direction is in the lateral direction of the patient.

Accordingly, as described above, the light-emitting device 1 has low stray light, and so the light that reaches the eyes of the patient can be low, and the glare perceived by the patient can be reduced. The light utilization efficiency of the light-emitting device 1 is high, so that the light utilization efficiency of the lighting device 100 also is high. As a result, lighting that has high illuminance with low power can be realized.

First Modification of Third Embodiment

Figure 20:
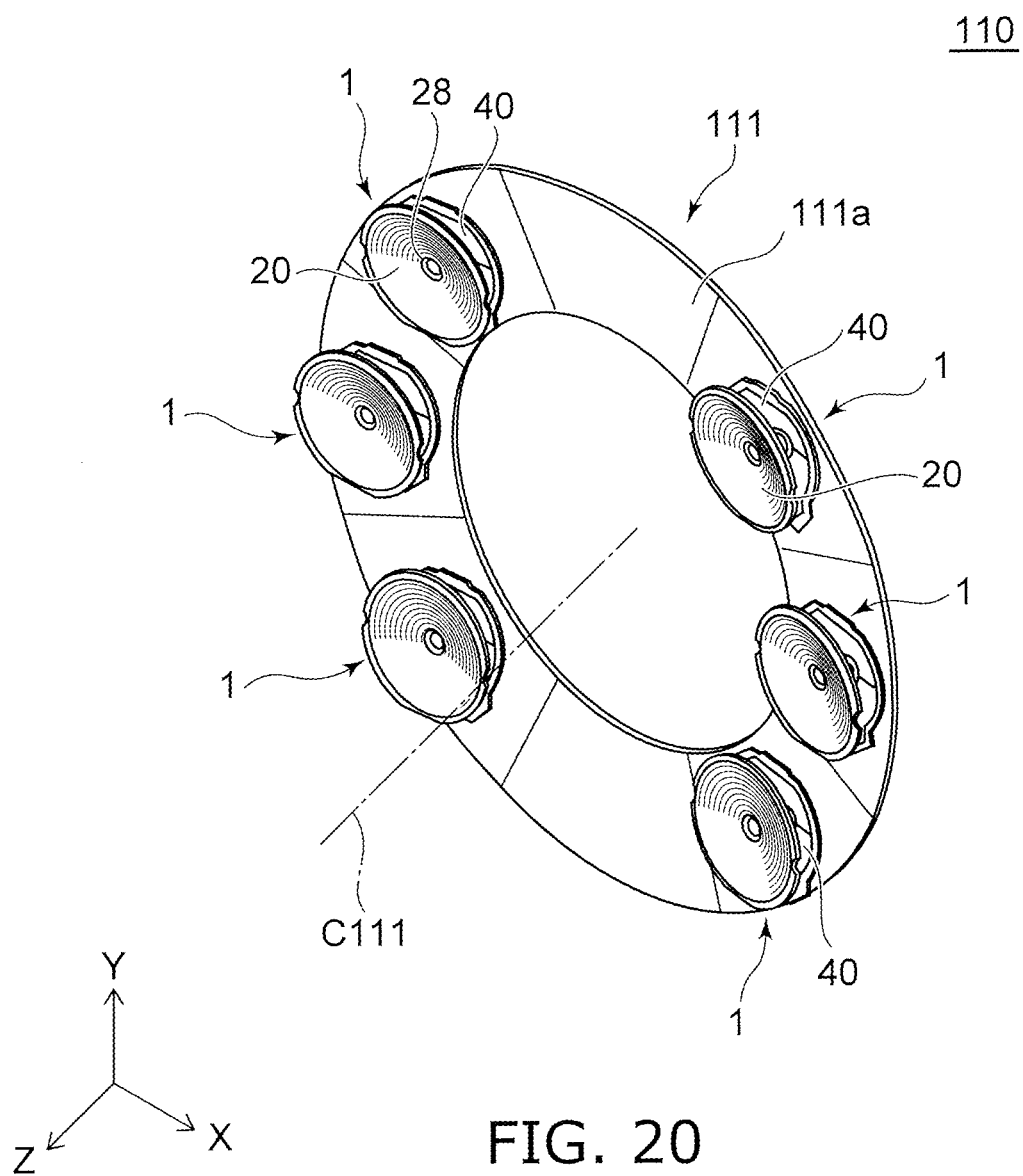
FIG. 20 is a perspective view showing a lighting device according to a first modification of the third embodiment, and is a drawing when viewed from the first direction side.

FIG. 20 is a perspective view showing a lighting device according to a modification, and is a drawing when viewed from the first direction Z side.

Figure 21:
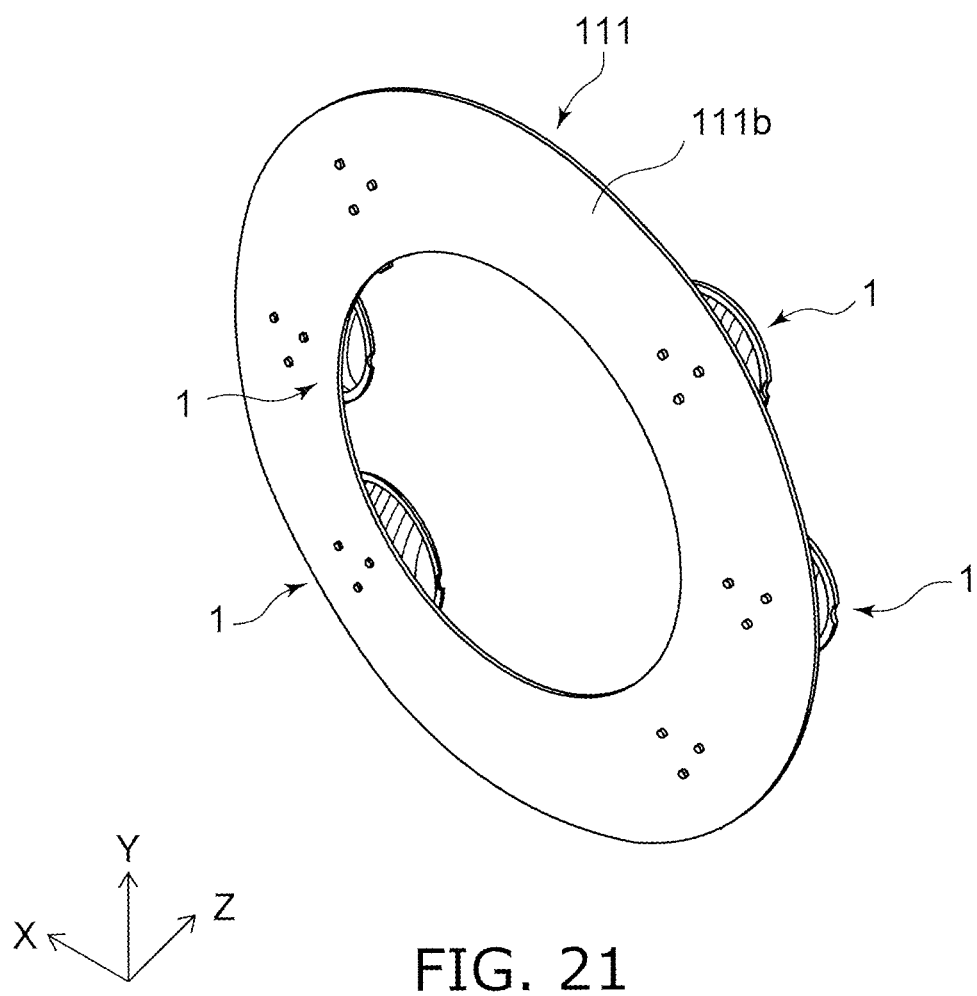
FIG. 21 is a perspective view showing the lighting device according to the first modification of the third embodiment, and is a drawing when viewed from the side opposite to the first direction.

FIG. 21 is a perspective view showing the lighting device according to the modification, and is a drawing when viewed from the side opposite to the first direction Z.

Figure 22:
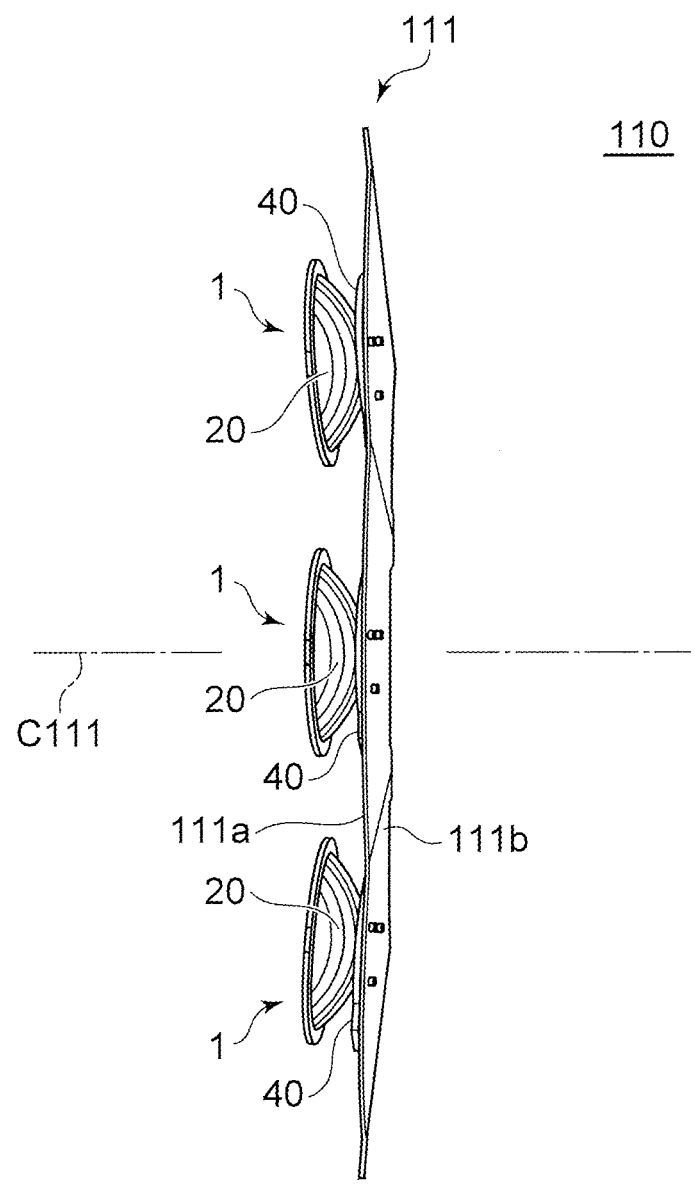
FIG. 22 is a side view showing the lighting device according to the first modification of the third embodiment.

FIG. 22 is a side view showing the lighting device according to the modification.

As shown in FIGS. 20 to 22, the lighting device 110 according to the modification includes a circular-ring-shaped frame 111 and six light-emitting devices 1. The frame 111 includes an upper surface 111a facing the first direction Z side, and a lower surface 111b facing the side opposite to the first direction Z. The surface 111a of the frame 111 when viewed from the first direction Z side is tilted toward the center of the frame 111 in the direction opposite to the first direction Z. In other words, the farther the upper surface 111a is away from a central axis C111 of the frame 111, the further upward the upper surface 111a is located in the first direction Z.

The six light-emitting devices 1 are located at the upper surface 111a of the frame 111. However, the six light-emitting devices 1 are not arranged at uniform spacing along the outer perimeter of the frame 111; and three light-emitting devices 1 are located at each region of the upper surface 111a at the two sides in the second direction X. The lower surface of the substrate 40 of each light-emitting device 1 is fixed to the upper surface 111a of the frame 111. Other configuration, operations, and effects according to the modification are similar to those of the third embodiment.

Second Modification of Third Embodiment

Figure 23:
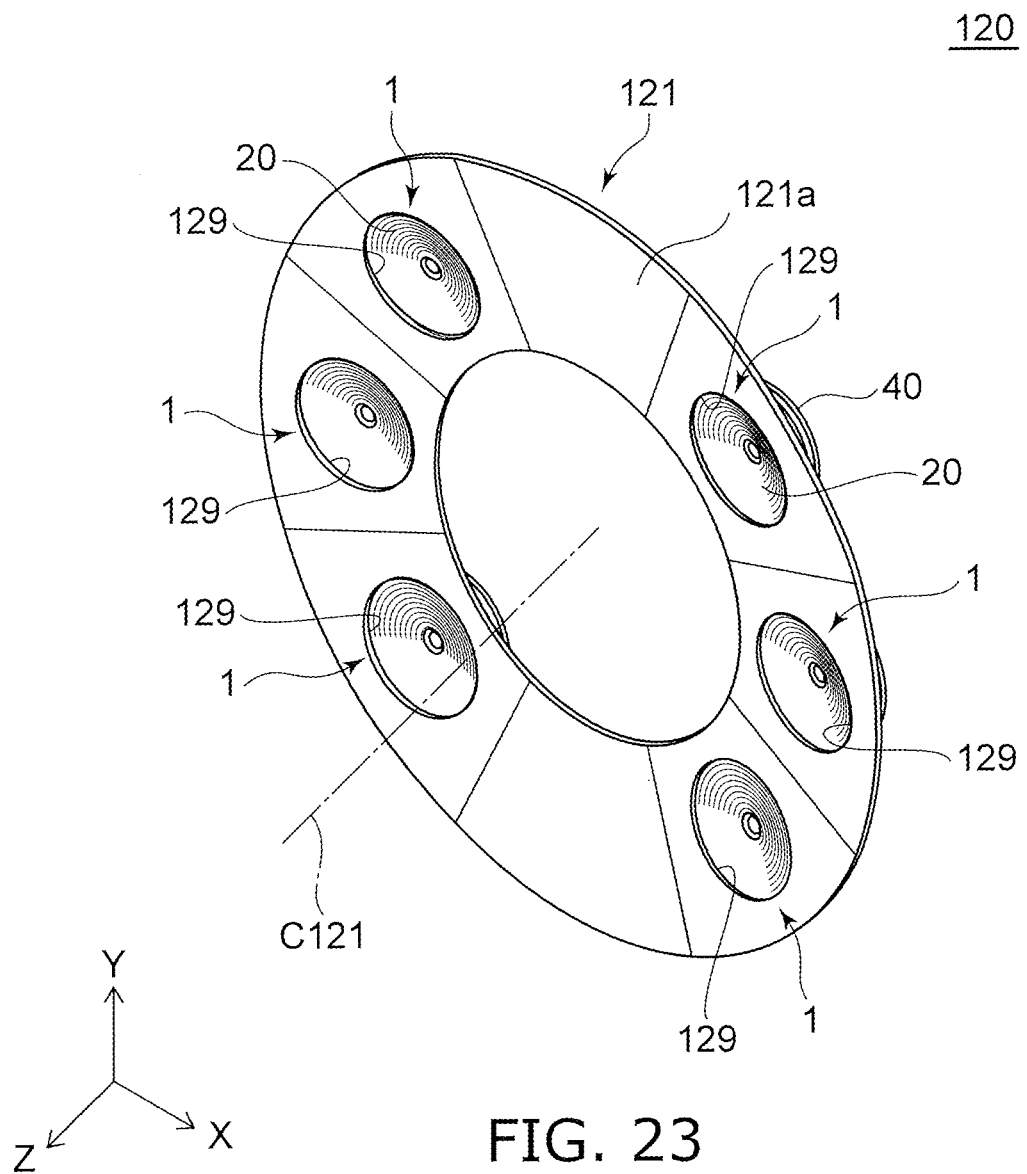
FIG. 23 is a perspective view showing a lighting device according to a second modification of the third embodiment, and is a drawing when viewed from the first direction side.

FIG. 23 is a perspective view showing a lighting device according to a modification, and is a drawing when viewed from the first direction Z side.

Figure 24:
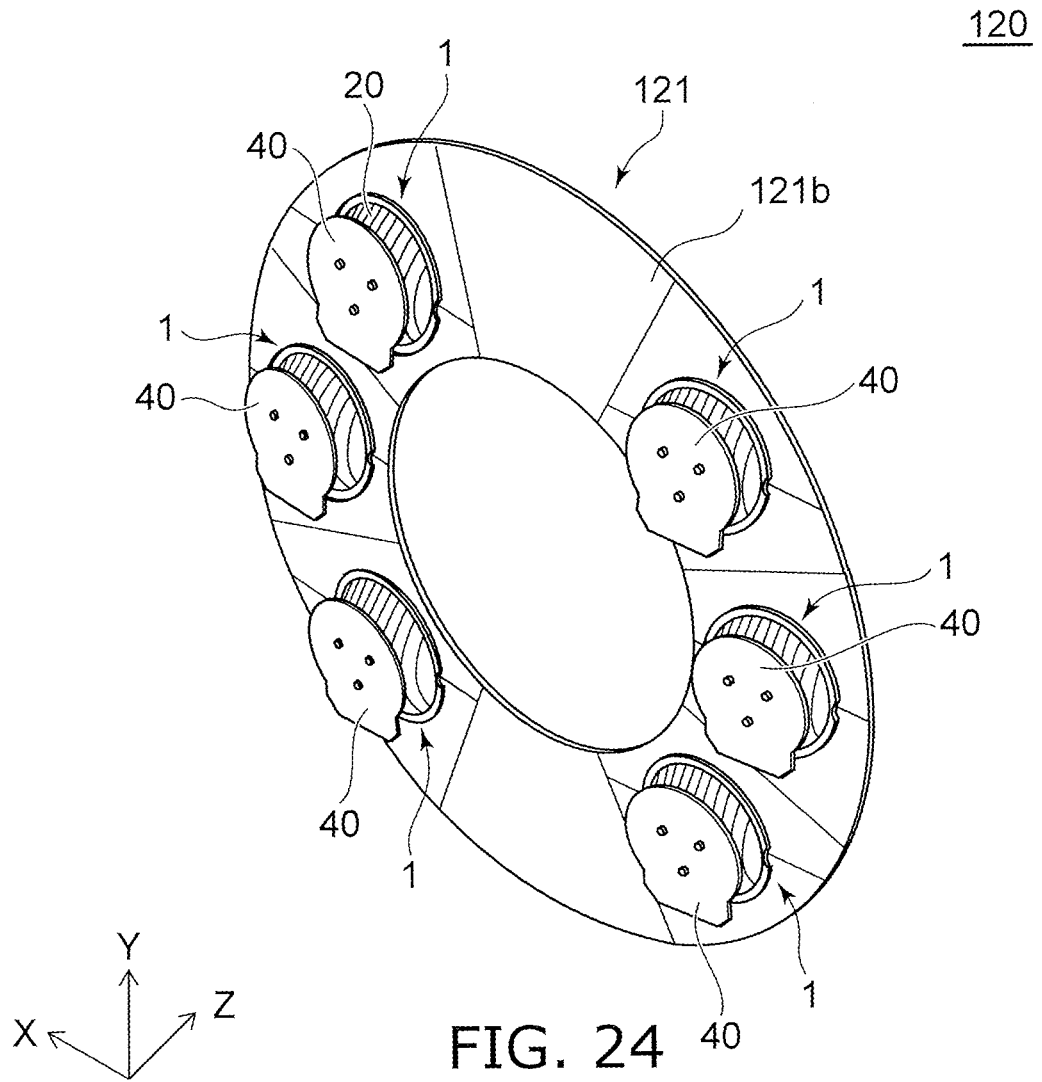
FIG. 24 is a perspective view showing the lighting device according to the second modification of the third embodiment, and is a drawing when viewed from the side opposite to the first direction.

FIG. 24 is a perspective view showing the lighting device according to the modification, and is a drawing when viewed from the side opposite to the first direction Z.

Figure 25:
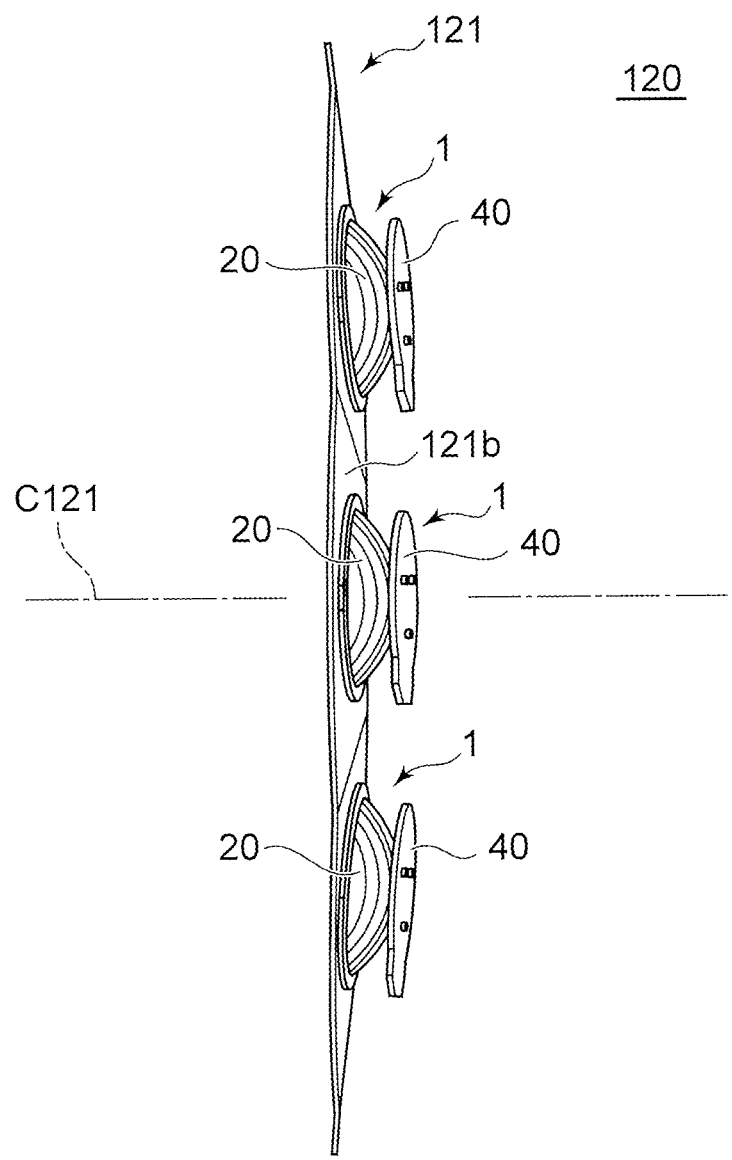
FIG. 25 is a side view showing the lighting device according to the second modification of the third embodiment.

FIG. 25 is a side view showing the lighting device according to the modification.

As shown in FIGS. 23 to 25, the lighting device 120 according to the modification includes a circular-ring-shaped frame 121 and six light-emitting devices 1. A surface 121a of the frame 121 when viewed from the first direction Z side and a surface 121b of the frame 121 when viewed in the direction opposite to the first direction Z are tilted in the direction opposite to the first direction Z toward the center of the frame 121. In other words, the farther the upper surface 121a and the lower surface 121b are away from a central axis C121 of the frame 121, the further upward the upper surface 121a and the lower surface 121b are located in the first direction Z. The frame 121 is divided into eight sections along the outer perimeter of the frame 121; and through-parts 129 are provided in the six sections other than the two sections located at the two sides in the third direction Y.

The outer perimeter part of the upper surface of the optical member 20 of each light-emitting device 1 is fixed to the region of the lower surface 121b of the frame 121 surrounding the through-part 129. As a result, the light-emitting device 1 is located at the lower surface 121b side of the frame 121; and the optical member 20 of the light-emitting device 1 is exposed in the through-part 129 at the upper surface 121a of the frame 121. Other configuration, operations, and effects according to the modification are similar to those of the third embodiment.

Third Modification of Third Embodiment

Figure 26:
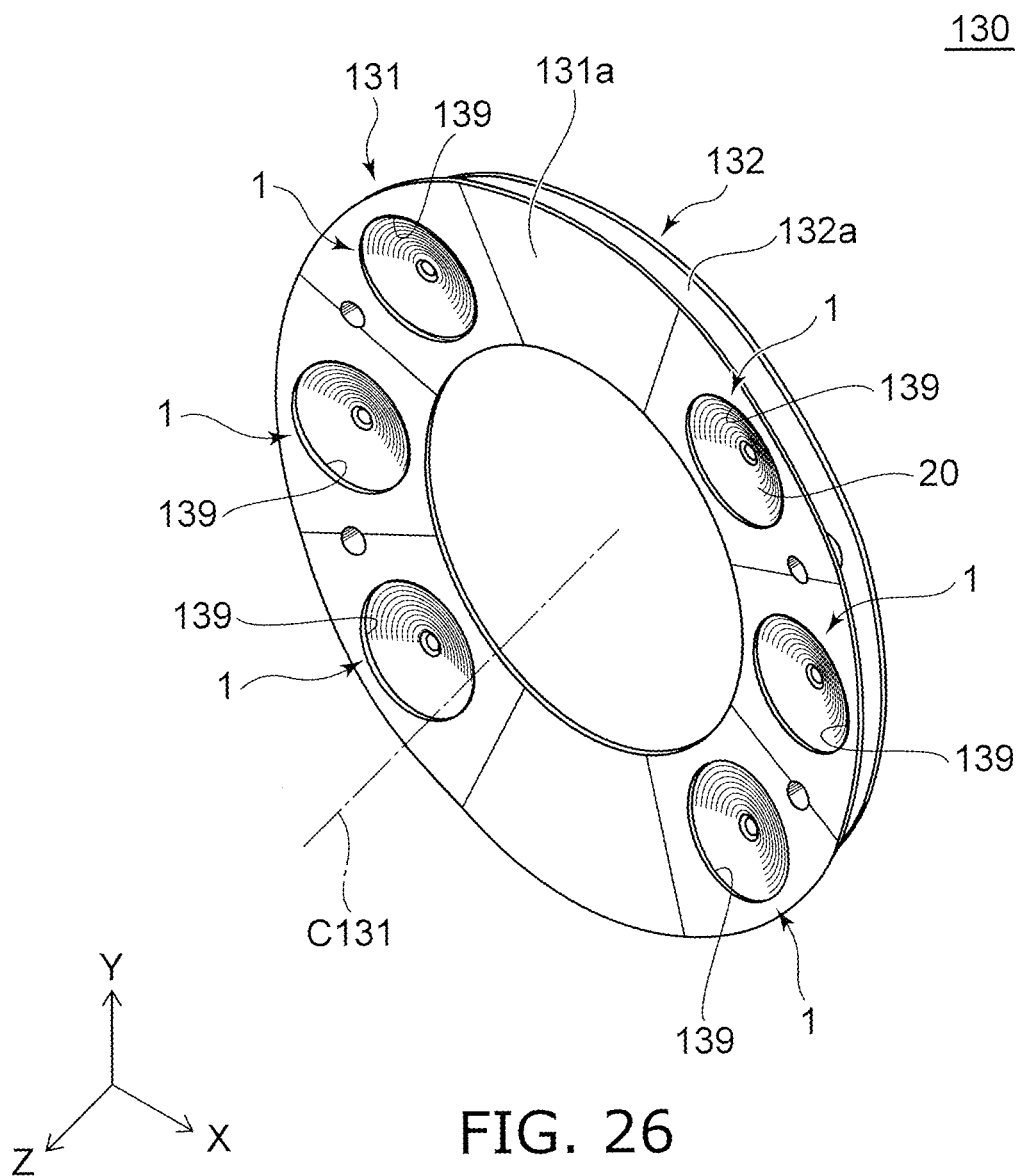
FIG. 26 is a perspective view showing a lighting device according to a third modification of the third embodiment, and is a drawing when viewed from the first direction side.

FIG. 26 is a perspective view showing a lighting device according to a modification, and is a drawing when viewed from the first direction Z side.

Figure 27:
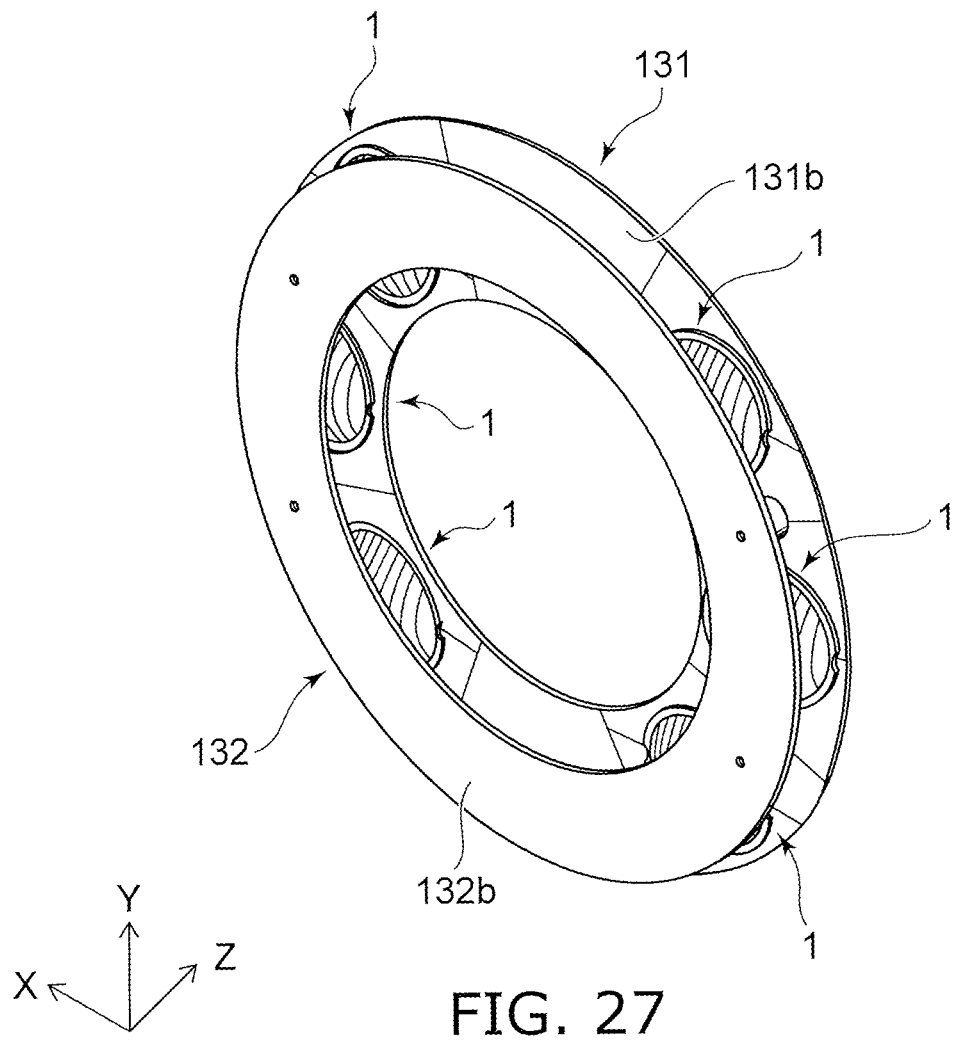
FIG. 27 is a perspective view showing the lighting device according to the third modification of the third embodiment, and is a drawing when viewed from the side opposite to the first direction.

FIG. 27 is a perspective view showing the lighting device according to the modification, and is a drawing when viewed from the side opposite to the first direction Z.

Figure 28:
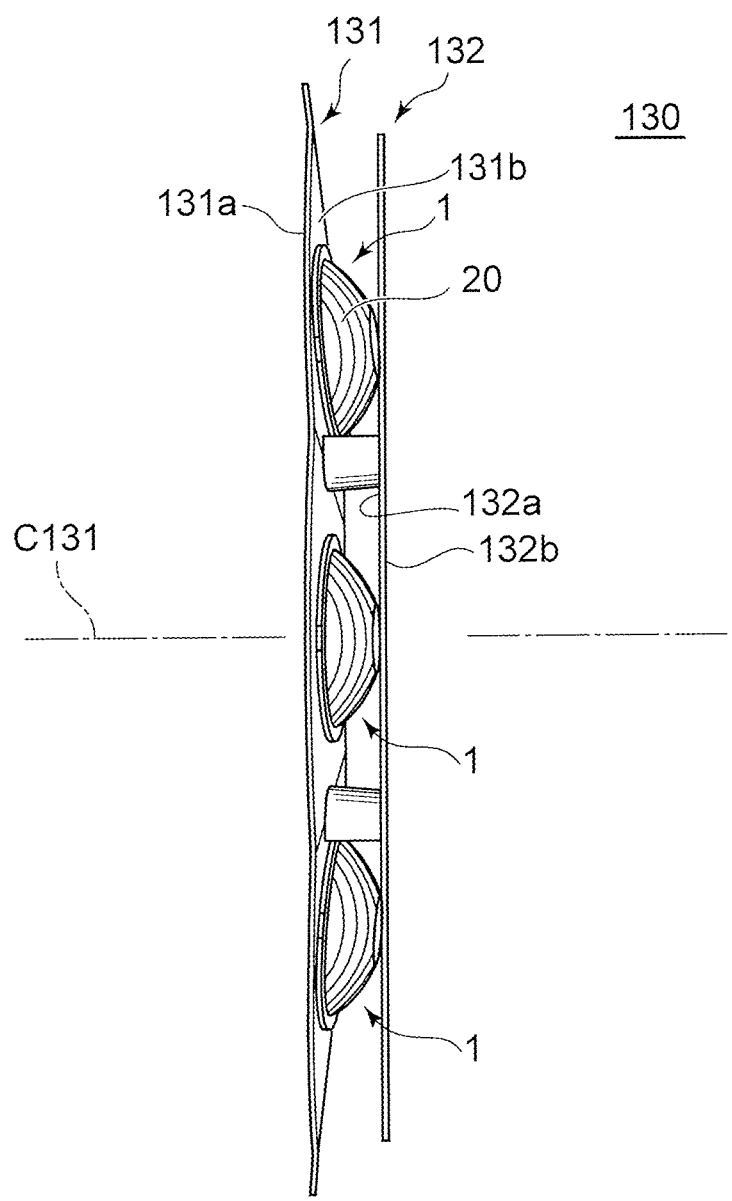
FIG. 28 is a side view showing the lighting device according to the third modification of the third embodiment.

FIG. 28 is a side view showing the lighting device according to the modification.

Figure 29:
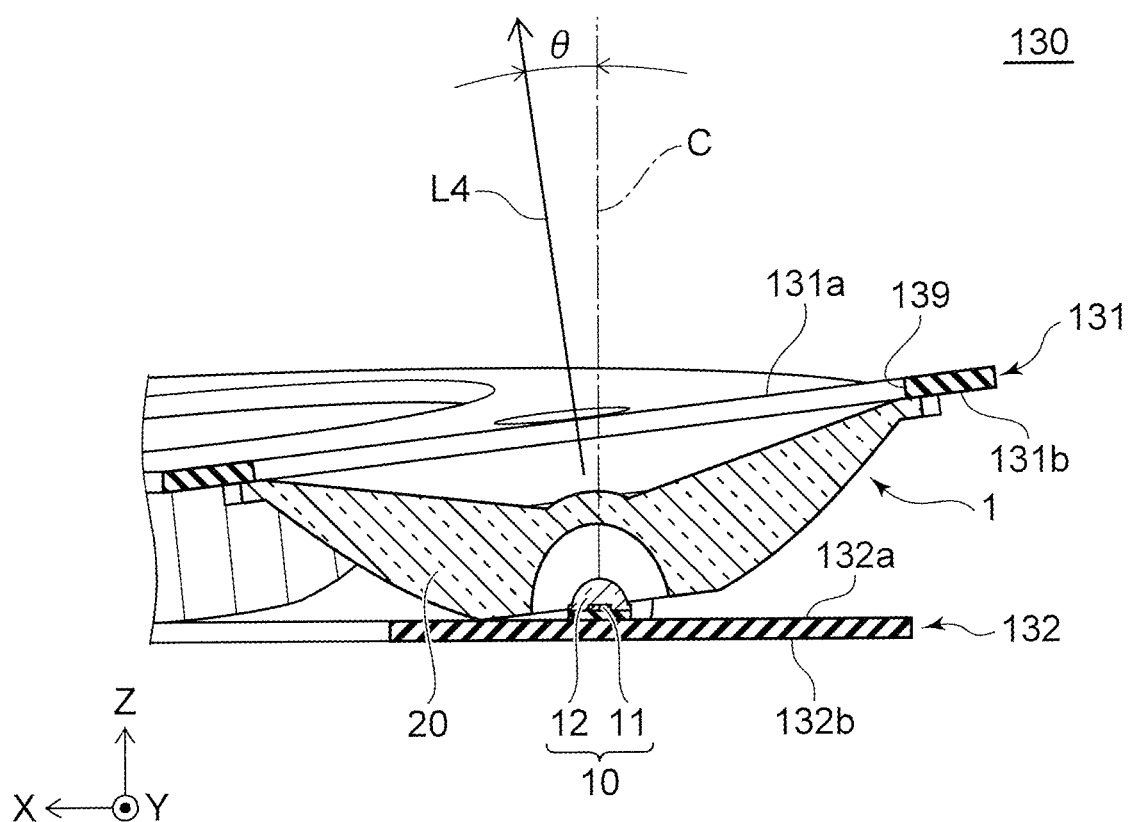
FIG. 29 is a partially enlarged cross-sectional view showing the lighting device according to the third modification of the third embodiment.

FIG. 29 is a partially enlarged cross-sectional view showing the lighting device according to the modification.

As shown in FIGS. 26 to 29, the lighting device 130 according to the modification includes a circular-ring-shaped frame 131, a circular-ring-shaped flat substrate 132, and six light-emitting devices 1. The configuration of the frame 131 is similar to the configuration of the frame 121 according to the second modification. The optical member 20 of the light-emitting device 1 is fixed to a lower surface 131b of the frame 131, and is exposed in a through-part 139 at an upper surface 131a of the frame 131.

The flat substrate 132 is positioned below the frame 131 and is fixed to the frame 131. The outer perimeter of the flat substrate 132 is located inward of the outer perimeter of the frame 131 when viewed in the first direction Z. In other words, when viewed in the first direction Z, the entire flat substrate 132 is concealed behind the frame 131. An upper surface 132a and a lower surface 132b of the flat substrate 132 are flat and are parallel to the XY-plane.

According to the modification, the light-emitting device 1 does not include the substrate 40; and the light source 10 is fixed to the upper surface 132a of the flat substrate 132. The optical member 20 is not fixed to the flat substrate 132, and is fixed to the frame 131. It is favorable for a portion of the optical member 20 to be in contact with the flat substrate 132. However, the optical member 20 can be separated from the flat substrate 132. As described above, the light source 10 is fixed to the flat substrate 132; the optical member 20 is fixed to the frame 131; and the flat substrate 132 is fixed to the frame 131; therefore, for each light-emitting device 1, the positional relationship between the light source 10 and the optical member 20 is fixed.

With the flat upper surface 132a of the flat substrate 132, the optical axes C of the light sources 10 are parallel to each other, and are parallel to a central axis C131 of the frame 131. On the other hand, the surface 131a of the frame 131 when viewed from the first direction Z side is tilted in the direction opposite to the first direction Z, so that the main directions of the light L4 emitted from the six light-emitting devices 1 are tilted with respect to each other. Tilt angles θ of the main directions of the light L4 with respect to the optical axes C of the light sources 10 are, for example, 0 degrees to 22 degrees. The light L4 that is emitted from the light-emitting devices 1 intersects at the imaging surface 200. Other configuration, operations, and effects according to the modification are similar to those of the third embodiment.

First Comparative Example

Figure 30:
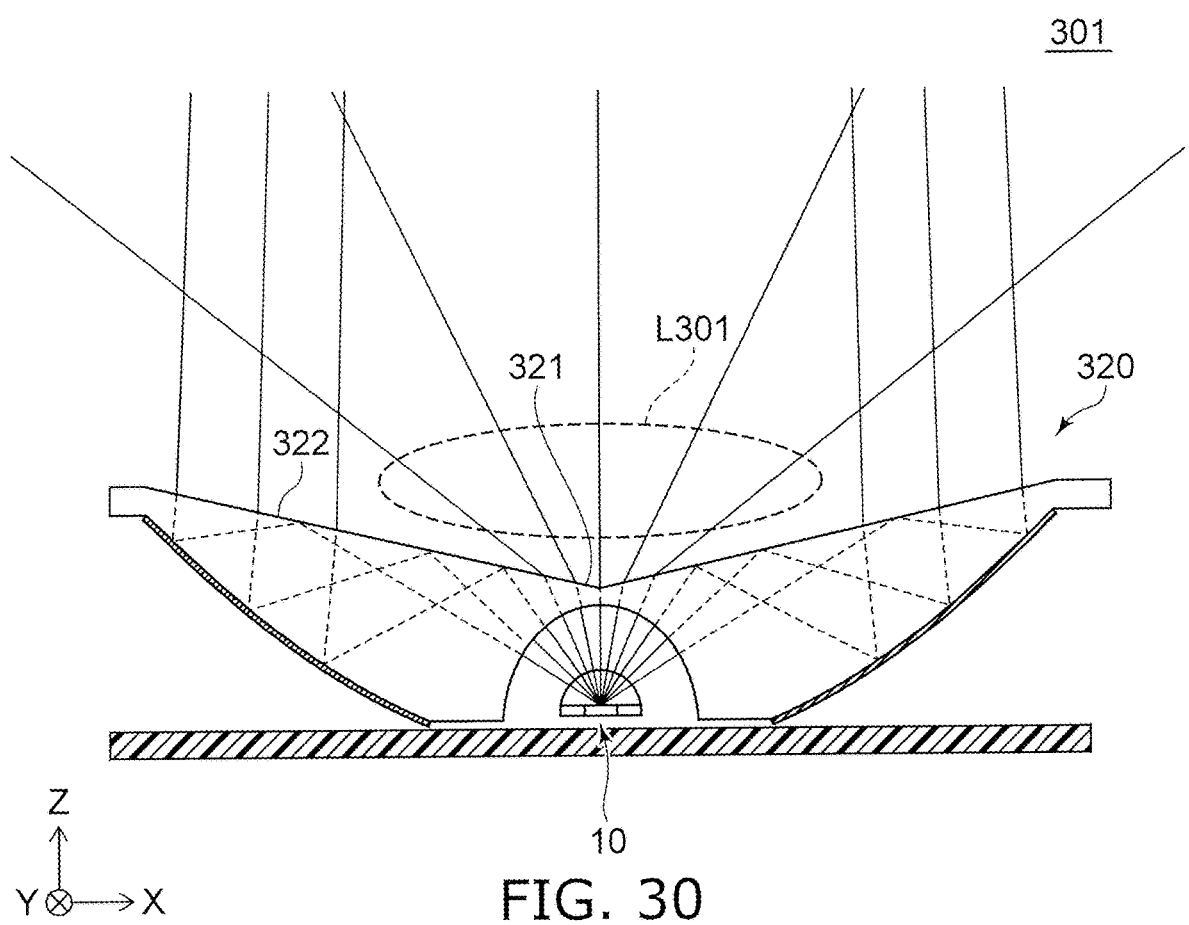
FIG. 30 is a ray diagram showing a light-emitting device according to a first comparative example.

FIG. 30 is a ray diagram showing a light-emitting device according to a comparative example.

In the light-emitting device 301 according to the comparative example as shown in FIG. 30, the farther a portion of the upper surface of an optical element 320 is away from the optical axis C, the higher the portion is continuously located. Therefore, a first region 321 of the optical element 320 corresponding to the first region 21 of the light-emitting device 1 according to the first embodiment is continuous with a second region 322. In other words, the first region 321 is not convex; and corner cubes are not formed in the first region 321. Furthermore, a metal member is not provided at the first region 321.

In the light-emitting device 301, the light that is emitted from the light source 10, travels through the optical element 320, and reaches the first region 321 is emitted to the outside of the optical element 320 via the first region 321 without being reflected by the first region 321. This light becomes stray light L301; and a portion of the stray light L301 reaches the eyes of the patient. Therefore, the patient easily perceives glare. Also, the light utilization efficiency is lower because the amount of light reaching the irradiation region 201 is reduced by the amount of stray light generated.

Second Comparative Example

Figure 31:
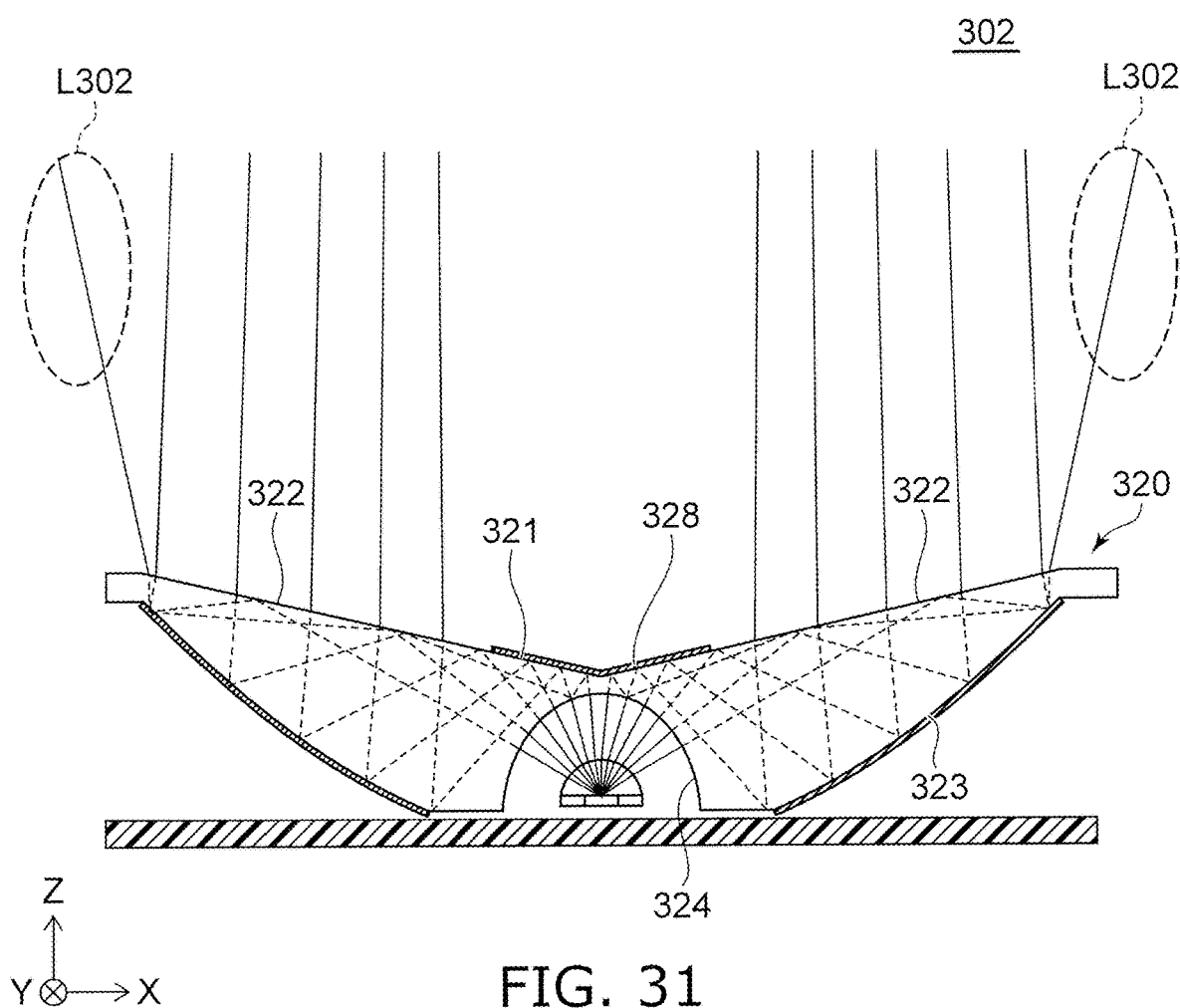
FIG. 31 is a ray diagram showing a light-emitting device according to a second comparative example.

FIG. 31 is a ray diagram showing a light-emitting device according to a comparative example.

In the light-emitting device 302 according to the comparative example as shown in FIG. 31, a metal member 328 is located in the first region 321. This structure allows for reducing the stray light L301.

However, a portion of the light reflected by the metal member 328 is totally reflected by an incident region 324. Accordingly, the light that enters the optical element 320 through the incident region 324, is reflected by the metal member 328, and is totally reflected by the incident region 324 is then reflected by the second region 322, reflected by a third region 323, and emitted from the light-emitting device 302 via the second region 322 to become stray light L302. A portion of the stray light L302 easily reaches the eyes of the patient and causes the patient to perceive glare. Also, the light utilization efficiency is reduced by the amount of the stray light generated.

Third Comparative Example

Figure 32:
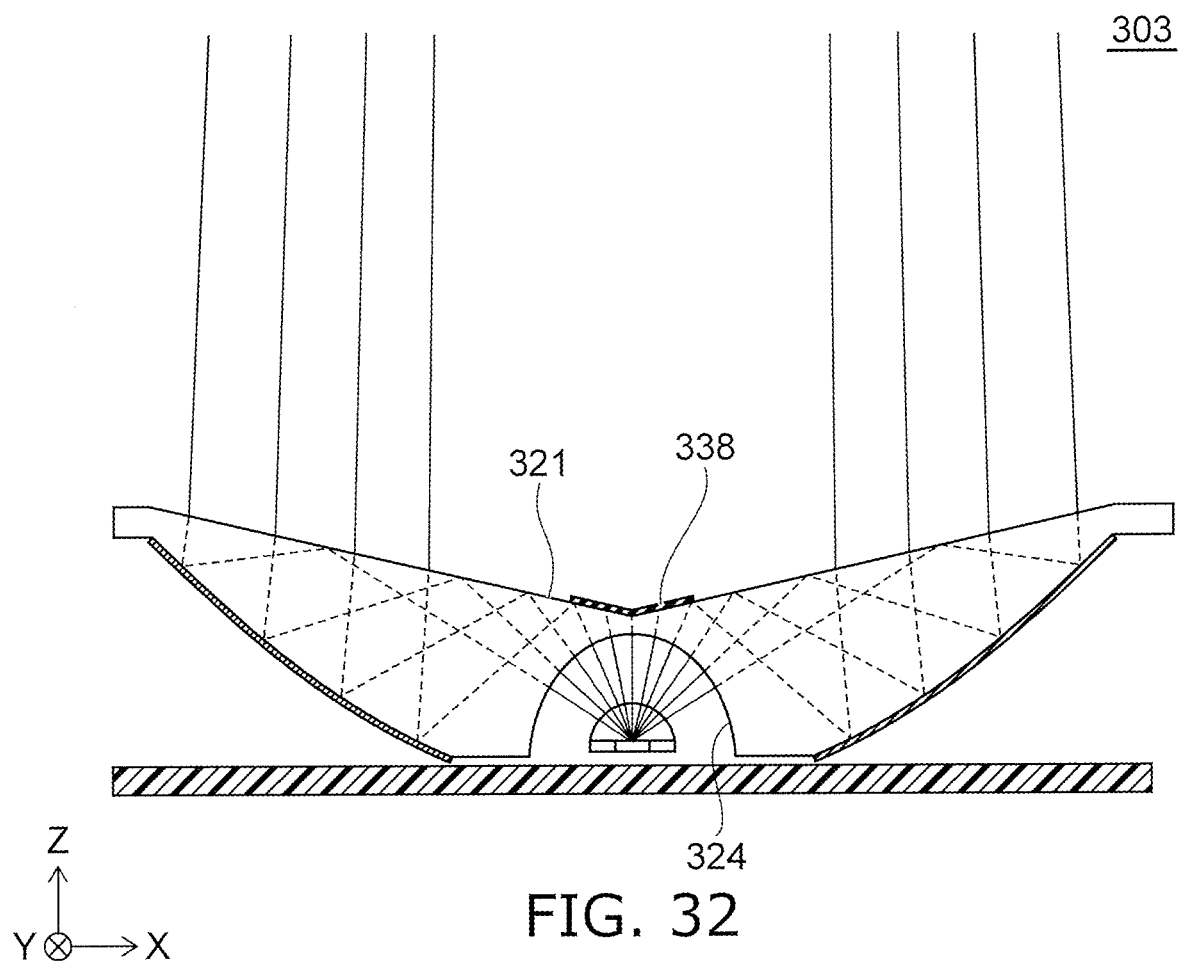
FIG. 32 is a ray diagram showing a light-emitting device according to a third comparative example.

FIG. 32 is a ray diagram showing a light-emitting device according to a comparative example.

In the light-emitting device 303 according to the comparative example as shown in FIG. 32, a light-shielding member 338 is provided at the first region 321. The stray light L301 shown in FIG. 30 is reduced thereby. Because light is substantially not reflected by the light-shielding member 338, the stray light L302 shown in FIG. 31 also is reduced. However, the light utilization efficiency is low because the light that reaches the first region 321 is absorbed by the light-shielding member 338.

Test Examples

The light-emitting device 1 according to the first embodiment, the light-emitting device 301 according to the first comparative example, the light-emitting device 302 according to the second comparative example, and the light-emitting device 303 according to the third comparative example were actually manufactured and caused to emit light by supplying the same power; and the illuminance at the center of the irradiation region 201 was measured. When the center illuminance of the light-emitting device 301 was taken to be 100.0%, the center illuminance of the light-emitting device 302 was 109.8%, the center illuminance of the light-emitting device 303 was 95.7%, and the center illuminance of the light-emitting device 1 was 117.2%. Thus, the center illuminances of the light-emitting devices 301, 302, and 303 were less than the center illuminance of the light-emitting device 1.

Embodiments and their modifications described above are examples embodying the invention; and the invention is not limited to these embodiments and their modifications. For example, additions, deletions, or modifications of some of the components of the embodiments and modifications described above also are included in the invention. The embodiments and modifications described above can be implemented in combination with each other.

What is claimed is:

1. A light-emitting device, comprising:
a light source comprising a light-emitting element, the light source having an optical axis extending in a first direction; and
an optical element having a surface including
an incident region on which light emitted from the light source is incident,
a first region positioned at a side opposite to the incident region, the first region being larger than the light-emitting element when viewed in the first direction,
the first region configured to reflect, toward the light source, a first light entering the optical element through the incident region,
the first region configured to reflect, toward the light source:
a portion of the first light that reaches a central region of the first region, the central region overlapping the light-emitting element when viewed in the first direction, and
a portion of the first light that reaches an outer region of the first region positioned outward of the central region,
a ring-shaped second region surrounding the first region, the second region being configured to reflect a second light entering the optical element through the incident region, and
a ring-shaped third region surrounding the incident region, the third region configured to reflect, toward the second region, the second light that is reflected by the second region, wherein
the optical element is configured such that:
light that is reflected by the third region is emitted from the second region, and
each of the first light and the second light includes the light emitted from the light source and a third light, which is reflected by the light source after being reflected by the first region,
each of a first cross section of the third region and a cross section of the third region parallel to the first cross section is a polygonal line made by connecting a plurality of line segments, the first cross section including a first axis and one second axis orthogonal to the first axis, the first axis being the optical axis of the light source, and
each of a second cross section of the third region and a cross section of the third region parallel to the second cross section is a continuous curve, the second cross section including the first axis and a third axis, the third axis being orthogonal to the first and second axes.

2. The light-emitting device according to claim 1, wherein the first region is configured to retroreflect the first light.

3. The light-emitting device according to claim 1, wherein the first region is a convex curved surface.

4. The light-emitting device according to claim 3, wherein the convex curved surface is a surface of revolution with the optical axis of the light source serving as a rotation axis.

5. The light-emitting device according to claim 1, wherein the first region comprises a plurality of corner cubes.

6. The light-emitting device according to claim 5, wherein the plurality of corner cubes is arranged in a convex shape with respect to the second region.

7. The light-emitting device according to claim 1, wherein the incident region has a concave shape, and the light source is located inside a recess of the optical element defined by the incident region.

8. The light-emitting device according to claim 7, wherein the incident region includes a curved surface.

9. The light-emitting device according to claim 7, wherein in a cross section including the optical axis of the light source, a depth of the recess is greater than a width of an opening of the recess.

10. The light-emitting device according to claim 1, wherein
the optical element includes:
a light-transmitting member; and
a metal member covering the light-transmitting member in the first region.

11. The light-emitting device according to claim 10, wherein
the metal member continuously covers the first region and a portion of the second region.

12. The light-emitting device according to claim 1, wherein
the optical element includes:
a light-transmitting member; and
a reflecting member covering the light-transmitting member in the third region.

13. The light-emitting device according to claim 1, wherein
the light source further includes a wavelength conversion part.

14. A lighting device, comprising:
at least one light-emitting device according to claim 1.

15. The lighting device according to claim 14, wherein the lighting device is for dental treatment.

\* \* \* \* \*